US008204618B2

(12) United States Patent
Young, Jr. et al.

(10) Patent No.: US 8,204,618 B2
(45) Date of Patent: Jun. 19, 2012

(54) METHOD AND APPARATUS FOR OPERATING AN AUTOMATED HIGH TEMPERATURE THERMAL CUTTING SYSTEM

(75) Inventors: Roger E. Young, Jr., West Lebanon, NH (US); Peter V. Brahan, North Sutton, NH (US)

(73) Assignee: Hypertherm, Inc., Hanover, NH (US)

( * ) Notice: Subject to any disclaimer, the term of this patent is extended or adjusted under 35 U.S.C. 154(b) by 463 days.

(21) Appl. No.: 12/409,411

(22) Filed: Mar. 23, 2009

(65) Prior Publication Data
US 2009/0240368 A1    Sep. 24, 2009

Related U.S. Application Data

(60) Provisional application No. 61/039,077, filed on Mar. 24, 2008.

(51) Int. Cl.
*G06F 19/00* (2011.01)
*B23K 9/00* (2006.01)

(52) U.S. Cl. .................... 700/160; 700/166; 219/121.39

(58) Field of Classification Search .................. 700/108, 700/117, 159, 160, 166; 219/121.39, 121.48, 219/121.54, 121.57, 69.1
See application file for complete search history.

(56) References Cited

U.S. PATENT DOCUMENTS

| 5,304,773 | A  | * | 4/1994  | Kilian et al.      | 219/121.78 |
|-----------|----|---|---------|--------------------|------------|
| 5,822,207 | A  | * | 10/1998 | Hazama et al.      | 700/97     |
| 6,243,611 | B1 | * | 6/2001  | Hazama et al.      | 700/97     |
| 6,359,251 | B1 | * | 3/2002  | Picard et al.      | 219/121.57 |
| 6,622,058 | B1 | * | 9/2003  | Picard et al.      | 700/117    |
| 6,772,040 | B1 | * | 8/2004  | Picard et al.      | 700/166    |
| 6,900,408 | B2 | * | 5/2005  | Picard et al.      | 219/121.55 |
| 6,930,275 | B2 | * | 8/2005  | Yamazaki et al.    | 219/121.67 |
| 6,947,802 | B2 | * | 9/2005  | Picard et al.      | 700/117    |
| 7,010,938 | B2 | * | 3/2006  | Kaplan et al.      | 63/32      |
| 7,158,915 | B2 | * | 1/2007  | Wargon             | 702/156    |
| 7,375,303 | B2 | * | 5/2008  | Twarog             | 219/121.52 |
| 2005/0184037 | A1 | * | 8/2005 | Fukuyo et al.     | 219/121.72 |

OTHER PUBLICATIONS

Hypertherm Automation, "Hypertherm Shape Cutting Control: Operator's Manual" (2006) (214 pgs).

* cited by examiner

*Primary Examiner* — Charles Kasenge
(74) *Attorney, Agent, or Firm* — Proskauer Rose, LLP

(57) ABSTRACT

A method for setting up a cutting table for an automated high temperature thermal cutting system can include providing a computer-readable product to, for example, a digital signal processor (e.g., CNC). The computer-readable product can include data for at least one part to be cut from a workpiece (e.g., a part program). A user can be prompted to select values from a menu of mandatory operating parameters (e.g., using a graphical user interface) for a shape of the part to be cut from the workpiece. Mandatory operating parameters can include at least one of an operating current, a gas flow, a thickness of the workpiece, or a material of the workpiece.

36 Claims, 17 Drawing Sheets

METHOD AND APPARATUS FOR OPERATING AN AUTOMATED HIGH TEMPERATURE THERMAL CUTTING SYSTEM

CROSS-REFERENCE TO RELATED APPLICATION

This application claims the benefit of and priority to U.S. Provisional Patent Application No. 61/039,077 filed on Mar. 24, 2008, which is owned by the assignee of the instant application and the disclosure of which is incorporated herein by reference in its entirety.

FIELD OF THE INVENTION

The invention relates generally to the cutting of workpieces. More specifically, the invention relates to methods and devices for operating automated cutting systems, such as high temperature thermal cutting systems.

BACKGROUND OF THE INVENTION

High temperature thermal cutting systems (e.g., plasma arc systems, laser cutting systems, etc.) can be used for cutting metallic materials. The high temperature thermal cutting systems can be automated for automatically cutting a metallic workpiece. FIG. 1 shows a known automated plasma arc system 90. The depicted plasma arc cutting system 90 includes a plasma arc torch 100, an associated power supply/gas supply 110, a remote high-frequency (RHF) console 120, a positioning apparatus 130, a cutting table 140, a torch height control 150, and a digital signal processor 160 (e.g., an associated computerized numeric controller ("CNC")).

A user can place a workpiece on the cutting table 140 and mount the torch (e.g., a plasma arc torch 100) on a positioning apparatus 130. The positioning apparatus can provide relative motion between the tip of the torch and the workpiece to direct the plasma arc or a cutting laser along a processing path. The user can provide a start command to the digital signal processor 160 initiate the cutting process. As shown in FIG. 1, the digital signal processor 160 (e.g., CNC) accurately directs motion of the torch and/or the cutting table to enable the workpiece to be cut to a desired pattern. The digital signal processor 160 is in communication with the positioning apparatus 130. The positioning apparatus 130 uses signals from the digital signal processor 160 to direct the torch 100 along a desired cutting path. Position information is returned from the positioning apparatus 130 to the digital signal processor 160 to allow the digital signal processor 160 to operate interactively with the positioning apparatus 130 to obtain an accurate cut path.

The torch 100 for a plasma arc system 90 generally includes a torch body, an electrode mounted within the body, passages for cooling fluid and cut and shield gases, a swirl ring to control the fluid flow patterns, a nozzle with a central exit orifice, and electrical connections (not shown). A shield can also be provided around the nozzle to protect the nozzle and to provide a shield gas flow to the area proximate the plasma arc. Gases applied to the torch can be non-reactive (e.g., argon or nitrogen) or reactive (e.g., oxygen or air).

Referring to FIG. 1, the tip of the torch 100 during operation can be positioned proximate the workpiece by the positioning apparatus 130. A pilot arc is generated between the electrode (cathode) and the nozzle (anode) by using, for example, a high frequency, high voltage signal from the RHF console. The pilot arc ionizes gas from the gas console passing through the nozzle exit orifice. As the ionized gas reduces the electrical resistance between the electrode and the workpiece, the arc transfers from the nozzle to the workpiece (e.g., transferred plasma arc mode). The transferred plasma arc mode is characterized by a conductive flow of ionized gas from the electrode to the workpiece, thereby cutting the workpiece.

The digital signal processor 160 (e.g., computer numerical controller) can be configured to operate with a plasma arc, laser, oxy fuel, and/or water jet technologies. The digital signal processor 160 allows the user (e.g., an operator of the automated high temperature thermal cutting system) to manually configure a large number of operating parameters.

SUMMARY OF THE INVENTION

Automated high temperature thermal cutting systems, such as the plasma arc system 90 as described above and shown in FIG. 1, are highly complex. A user can input/vary a variety of several operating parameters (e.g., operating current, gas flow/composition, consumable type, torch type, workpiece thickness, workpiece material etc.). Unless the user knows the optimal values/desired choices for each of the different operating parameters (e.g., optimal gas flow/composition, optimal operating current, desired consumable types, desired torch type to be used for the specific process, etc.), a user can require several days of classes to learn how to effectively and accurately operate a digital signal processor. A novice user unfamiliar with the desired ranges/choices for operating parameters for different processes and unfamiliar with the mechanics of the digital signal processor would not be able to adequately operate an automated high temperature thermal cutting system. In practice, it can take a user several weeks to learn to use the digital signal processor to control the operating parameters (e.g., ranges of values for the different operating parameters) to properly program the automated high temperature thermal cutting system.

A computer program system (CPS) that guides the user through the process of programming/setting up a high temperature thermal cutting system can allow a novice user to operate the cutting system with little or no training. For example, instead of leaving it to the novice user to input various operating parameters, the computer program system can guide the user by presenting ranges of options/values from a menu of mandatory operating parameter(s) (e.g., a series of pre-selected operating parameters). The computer system can also instruct the user to load or confirm that the cutting system has been programmed/set-up as specified by a part program.

In one aspect, the invention features a method for setting up a cutting table for an automated high temperature thermal cutting system. The method can include the step of providing a computer-readable product including data for at least one part to be cut from a workpiece. The method can also include the step of prompting a user to select values from a menu of mandatory operating parameters for a shape of the at least one part to be cut from the workpiece. The mandatory operating parameters can include at least one of an operating current, a gas flow, a thickness of the workpiece, or a material of the workpiece.

The method can include the step of providing a computer-readable product including a library of part programs for a plurality of shapes. A user can be prompted to identify the shape of the at least one part to be cut from the workpiece.

The method can include the step of prompting the user to select values from the menu of mandatory operating parameters using a graphical user interface. The method can also include prompting the user to select values from a menu of operating parameters that include at least one of a type of high temperature thermal cutting system, a torch type or a consumable set. The user can be prompted to align the workpiece.

The automated high temperature thermal cutting system can be a plasma cutting system or a laser cutting system.

In another aspect, the invention features a computer readable product, tangibly embodied on an information carrier or a machine-readable storage device and operable on a digital signal processor for a high temperature thermal cutting system. The computer readable product can include instructions being operable to cause the digital signal processor to receive at least one part program including data for at least one part to be cut from a workpiece. At least one predetermined step can be presented to a user to select values from a menu of mandatory operating parameters for a shape of the at least one part to be cut. The predetermined step can include prompting the user to identify a first set of entries (e.g., a series of pre-selected operating parameters) including at least one of an operating current, a gas flow, a thickness of the workpiece or a material of the workpiece. A starting point to cut the at least one part from the workpiece can be selected based on an alignment of the workpiece.

In some embodiments, the at least one predetermined step prompts the user to identify the shape of the at least one part to be cut from the workpiece. Any of the steps described herein can be presented to the user via a graphical user interface.

A second predetermined step can prompt a user to select values from a menu of operating parameters. The second predetermined step can, for example, prompt the user to identify a second set of entries (e.g., a series of pre-selected operating parameters) including at least one of a type of high temperature thermal cutting system, a torch type or a consumable set. In some embodiments, the second predetermined step is presented to the user after the user has identified the first set of entries.

In some embodiments, the high temperature thermal cutting system is a plasma arc cutting system or a laser cutting system. Where the high temperature thermal cutting system is a laser cutting system, the first set of entries further can also include an assist gas composition, a focal length of a laser and/or a nozzle type.

The workpiece can be automatically aligned or manually aligned. At least one auto align sensor can scan the workpiece to determine the alignment of the workpiece. In some embodiments, the user manually aligns the workpiece. The user can be prompted to align the workpiece and the alignment is used to select the starting point to cut the at least one part from the workpiece. The alignment of the workpiece can be based on a corner of a cutting table for the high temperature thermal cutting system and at least one edge of the workpiece. Where the high temperature thermal cutting system is a laser cutting system, a laser pointer is used as a reference to align the torch head to the workpiece. A laser pointer can also be used to align a workpiece for a plasma cutting system.

In some embodiments, a user can be prompted to select a part clearance around edges of the work piece and a setting review is presented to the user. The setting review can present at least the mandatory operating parameters identified by the user from the first set of entries.

In yet another aspect, the invention features a computer readable product, tangibly embodied on an information carrier or a machine-readable storage device and operable on a digital signal processor for a high temperature thermal cutting system. The computer readable product can include instructions operable to cause the digital signal processor to receive a part program including data for at least one part to be cut from a workpiece, where the part program specifies a material type of the workpiece and a thickness of the workpiece. The user can be presented with a plurality of predetermined steps that can include a first step that prompts the user to load and align a workpiece having the material type and the thickness as specified by the part program. The plurality of predetermined steps can also include a second step that prompts the user to select values from a menu of mandatory operating parameters (e.g., a series of pre-selected operating parameters) for a shape of the at least one part to be cut. The second step can prompt the user to identify a first set of entries including at least an operating current or a gas flow.

In some embodiments, the plurality of predetermined steps includes a third step that prompts the user to identify the shape of the at least one part to be cut from the workpiece before prompting the user to identify the first set of entries. The first set of entries can include comprises at least torch type and a consumable set. The plurality of predetermined steps can also include a third step that prompts the user to load a consumable type for the torch type identified by the user in the second step. The consumable set can correspond to the identified operating current, either selected by the user or specified by the part program.

The first step can provide a bar code or identification number to the user identifying a corresponding workpiece having the material type and the thickness as specified by the part program (e.g., thereby prompting the user to load the workpiece bearing and/or identified by the corresponding bar code and/or identification number).

The part program can specify a consumable type to be loaded in the high temperature thermal cutting system. The plurality of predetermined steps can also include a third step that prompts the user to load the consumable type specified by the part program.

In some embodiments, the plurality of predetermined steps includes a third step to a user to select values from a menu of operating parameters, where the third step prompts the user to identify a second set of entries. The second set of entries can include a consumable type to load into a torch of the high temperature thermal cutting system.

In some embodiments, a starting point to cut the at least one part from the workpiece is selected based on an alignment of the workpiece.

In some embodiments, the material type of the workpiece is mild steel and the thickness of the workpiece is ½ inch. The first step can include prompting the user to load and align a ½ inch thick steel workpiece in the high temperature thermal cutting system.

In another aspect, the invention features a computer numerical controller for an automated high temperature thermal cutting system. The computer numerical controller can include a first module that processes data for at least one part to be cut from a workpiece and a second module that prompts a user to select values from a menu of mandatory operating parameters for a shape of the at least one part. Mandatory operating parameters can include at least one of an operating current, a gas flow, a thickness of the workpiece, or a material of the workpiece. The computer numerical controller can include a third module that selects a starting point to cut the at least one part from the workpiece based on an alignment of the workpiece.

The computer numerical controller can also include an alignment module that automatically aligns or allows the user to manually align the workpiece. The alignment module can process data from at least one auto align sensor that scans the workpiece to determine the alignment of the workpiece. The alignment module can process inputs from a user that manually aligns the workpiece. In some embodiments, the second module prompts the user to identify the shape of the at least one part to be cut from the workpiece.

In another aspect, the invention features an automated high temperature thermal cutting system that includes a torch tip that produces a cutting arc, a lead that provides a cutting current to the plasma arc torch, an automated gantry that moves the plasma torch tip and a computer numerical controller. The computer numerical controller can include a first module that processes data for at least one part to be cut from a workpiece and a second module that prompts a user to select values from a menu of mandatory operating parameters for a shape of the at least one part. Mandatory operating parameters can include at least one of an operating current, a gas flow, a thickness of the workpiece or a material of the workpiece. The computer numerical controller can also include a third module that selects a starting point to cut the at least one part from the workpiece based on an alignment of the workpiece.

In some embodiments, the automated high temperature thermal cutting system is a plasma arc torch system and the torch tip is a plasma torch tip including a nozzle and an electrode. The nozzle and electrode can define a plasma chamber, a plasma arc generated in the plasma chamber.

In another aspect, the invention features an apparatus for setting up a cutting table for an automated high temperature thermal cutting system. The apparatus can include means for processing at least one part program that includes data for at least one part to be cut from a workpiece and means for presenting at least one predetermined step to a user to select values from a menu of mandatory operating parameters for a shape of the at least one part. Mandatory operating parameters can include at least one of an operating current, a gas flow, a thickness of the workpiece or a material of the workpiece. The apparatus can also include means for aligning the workpiece and means for selecting a starting point to cut the at least one part from the workpiece based on an alignment of the workpiece.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
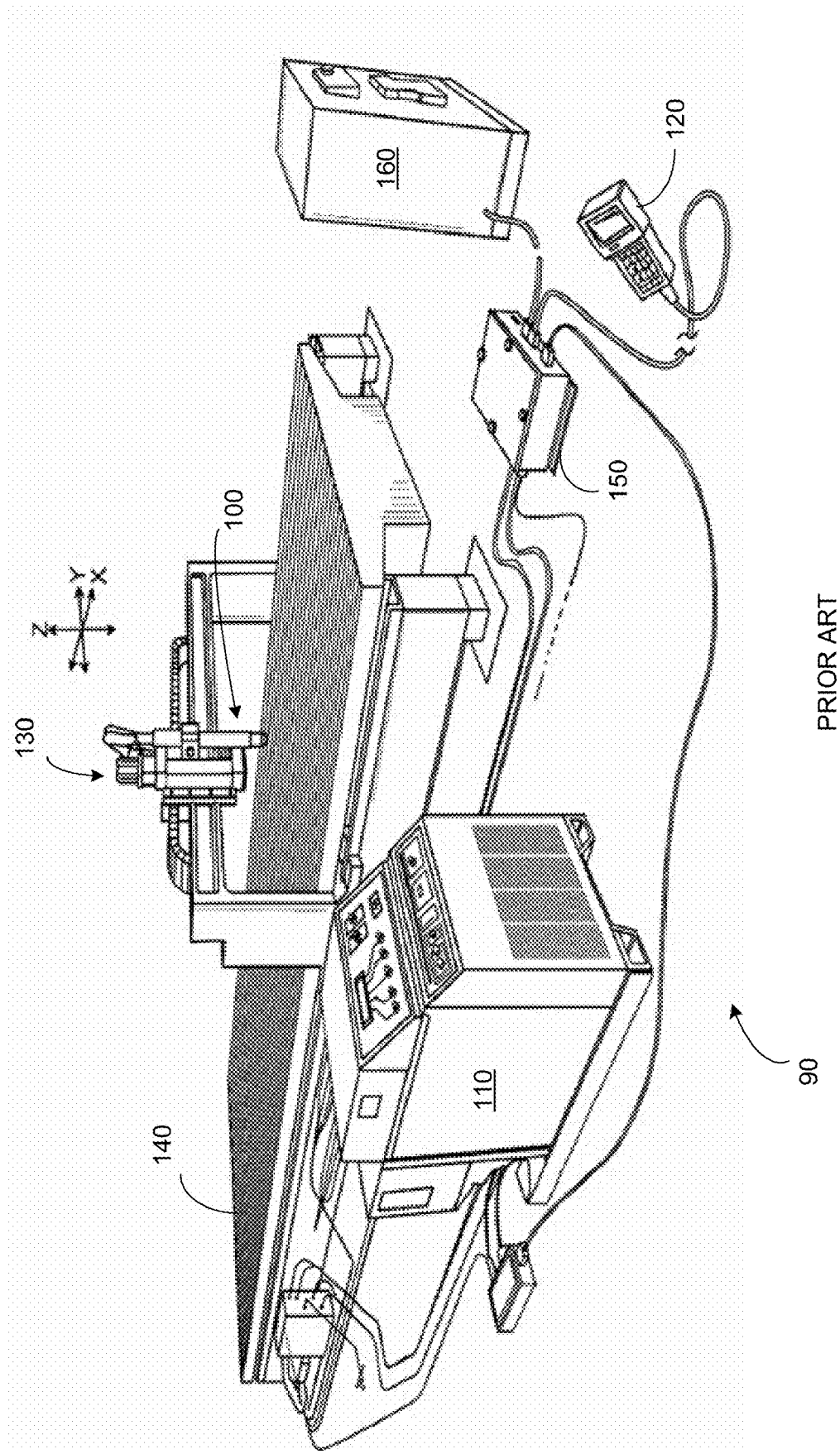
FIG. 1 shows a known automated plasma arc system.

An automated (e.g., mechanized) high temperature thermal cutting and/or processing system can include a laser cutting system or a plasma arc torch system 90 (e.g., the plasma arc torch system as shown in FIG. 1). Automated high temperature thermal cutting systems can be complex and be extremely difficult for a novice user to operate effectively. A computer program system (CPS) (e.g., a computer readable product such as a computer and/or software program tangibly embodied in a machine-readable storage device, for example, in a CD ROM, USB hard drive, or hard drive of a digital signal processor 160 shown in FIG. 1) can be used to guide the user to configure operating parameters (e.g., cutting tool parameters) for the cutting system. A CPS can also be an apparatus such as a CNC (Computerized Numeric Controller) (or other Digital Signal Processor (DSP)), embodying the method of the invention to store data or to display the inputs or results of the invention. Various modules of the invention can be stored and/or displayed on such devices. The CPS can prompt/ask the user to identify/select operating parameters using a graphical user interface. Based on a part program (e.g., a program containing data for at least one shape to be cut from a workpiece), the CPS can prompt a user accordingly to set up the cutting system. By way of example, the CPS can: 1) prompt/direct the user to set up the cutting system according to predetermined specifications (e.g., predetermined workpiece, consumable set, torch type, etc.) from the part program or 2) ask the user to identify/select values/options for a set of a minimal number of mandatory operating parameters (e.g., a series of pre-identified operating parameters). By prompting the user to identify a closed set of parameters or by providing specific instructions to the user to set up the system, the CPS can make it easier for a novice user to operate the system.

In some embodiments, the part program has a set of mandatory operating parameters to be identified by a user before operating the cutting system. For example, the CPS can prompt a user to identify a set of mandatory operating parameters, such as, for example, a cutting current, a gas type, a material type of the workpiece, and a thickness of the material. These minimal mandatory parameters can also be determined in other ways, such as by selection of a plasma torch type and consumable set, in combination with gas types and workpiece composition and thickness information. The CPS can prompt the user to identify operating parameters such as a shape of the part to be cut, a torch type, a type of cutting system (e.g., laser or plasma) or a consumable set. The user has some control/flexibility as the user can identify the operating parameters (e.g., either by inputting commands or by selecting from a list of options).

In some embodiments, a part program can specify the operating parameters for the cutting process. The CPS can provide prompts/commands so that the user can set up the cutting system. In this embodiment, the user would have less flexibility as the user is not given the opportunity to identify/select operating parameters. For example, the part program can specify a predetermined torch type, a consumable set, an operating current, operating gas, a power level, a material type of the workpiece and a thickness of the workpiece. A digital signal processor (e.g., the digital signal processor 160 of FIG. 1 or a CNC) can load/run the part program. Based on the specifications in the part program, the part program can prompt the user to load a specific torch type, consumable set, workpiece type (i.e., having the specified material type and/or thickness) into the cutting system. The part program can also prompt the user to confirm the operating parameters specified by the part program. For example, the part program can prompt the user to confirm that the torch type, workpiece material, workpiece thickness, etc. as specified by the part program are loaded into the cutting system.

Figure 2:
FIG. 2 shows an example of a user interface of a computer program system for operating an automated high temperature thermal cutting system, according to an illustrative embodiment of the invention.

FIG. 2 shows a welcome screen 170 for a user interface for an automated high temperature thermal cutting system, according to an illustrative embodiment of the invention. The user interface can be run from a computer program system such as a computer readable product (e.g., computer program product, software program) tangibly embodied on a machine-readable storage device (e.g., software program tangibly embodied on a CD-ROM, hard drive of a CNC) operable on a digital signal processor (e.g., CNC). The CPS is designed to streamline the number of parameters or modules from which a user (e.g., an operator of the automated high temperature thermal cutting system) selects to program an automated plasma arc system. By streamlining the number of parameters or modules from which a user identifies (e.g., limiting the number of operating parameters to those that are mandatory and/or presenting values/options for the operating parameters that the user selects from), a novice user can program the cutting system. In some embodiments, the computer readable product provides a help screen to provide technical information and/or guidance for each parameter or module.

As shown in FIG. 2, the welcome screen 170 can introduce, for example, a number of predetermined steps to the user. The CPS (e.g., a computer/software program based cutting wizard) can help load a part program or nest (e.g., program for a plurality of shapes and/or parts to be cut from a workpiece) 180. The CPS can configure the cutting system for the process (e.g., prompt user to select values/options for operating parameters or prompt user to confirm that the cutting system has been set up to conform with the operating parameters specified by the part program) 190. The CPS can also guide the user to align the workpiece (e.g., align the part to the plate) 200. The CPS can also help the user to start cutting the workpiece (e.g., select a starting point) 210. The user can select the option 220 to disable the CPS, for example, if the user is experienced and does not need the guidance of the CPS. The CPS can also include an indicator 221 that shows the progress in setting up the cutting system.

Figure 3:
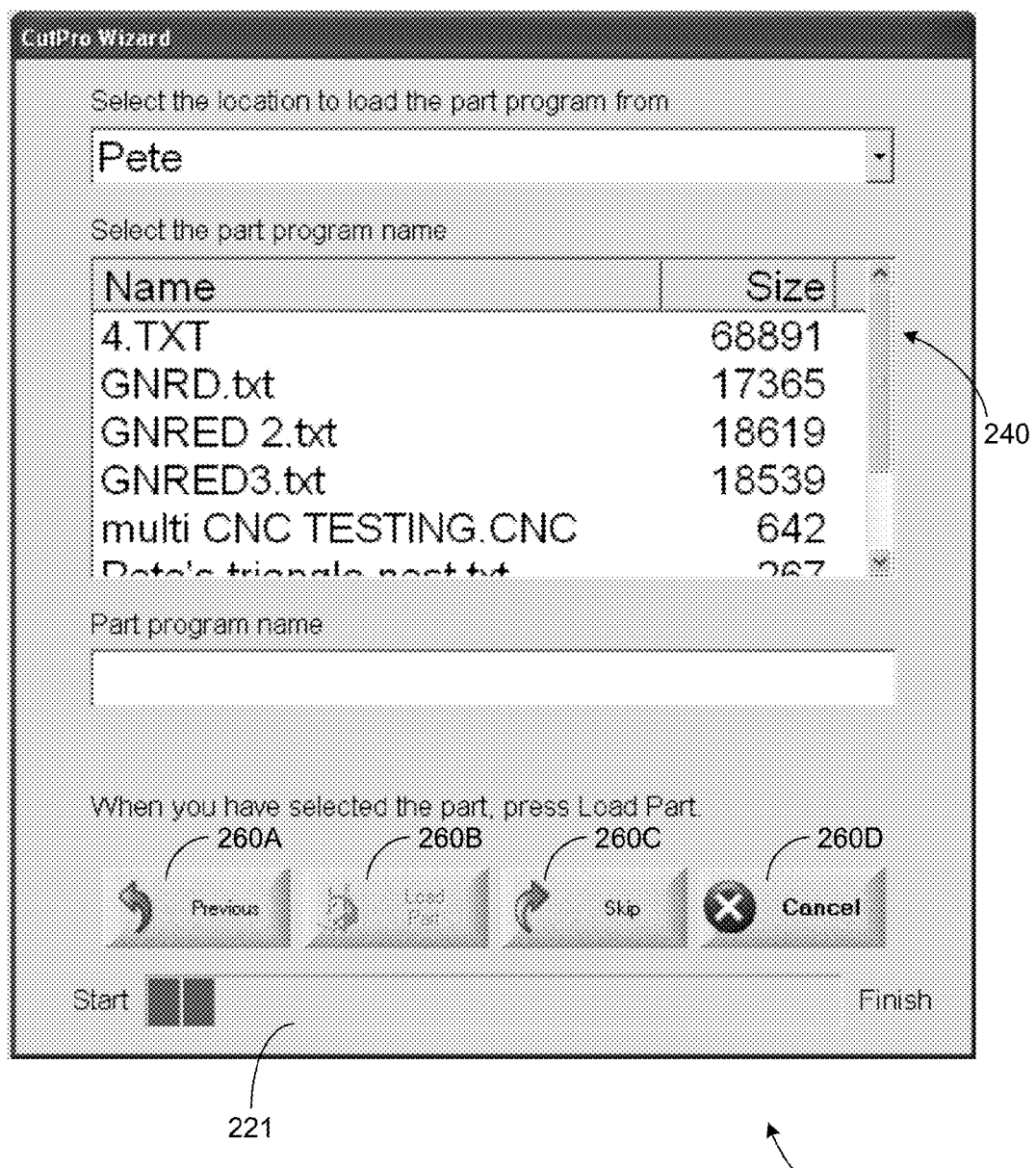
FIG. 3 shows an example of a user interface of a computer program system that presents a user with a plurality of part programs, according to an illustrative embodiment of the invention.

FIG. 3 shows a user interface (e.g., a graphical user interface) of a CPS that presents a user with a plurality of part programs, according to an illustrative embodiment of the invention. The CPS can present the user with an electronic library of part programs 240 (e.g., shape files) from which to choose. The CPS can allow the user to choose the location of the file (e.g., the part program) to be loaded. The CPS can prompt the user to select from a menu 250 or identify the location to load the part program from. For example, if the user has a specific part program stored in a location (e.g., CD ROM, Disk, USB Drive, etc.) the user can specify the desired part program using menu 250. The CPS also provides the user with features 260A-D that provides the user with the option of going to a previous step 260A, commanding the CPS to load the selected part program 260B, skipping the step 260C or cancelling the setup of the cutting system 260D.

In some embodiments, the CPS interfaces with a touch screen. The part programs 240 can be stored locally, in a network, or in a portable storage medium. The part programs 240 can include instructions for the automated high temperature thermal cutting system to cut a given shape, for example, from a shape library (e.g., a library of part programs for different corresponding shapes). The CPS can present a help screen (not shown) to provide the user with information related to the shape selection process.

A method for setting up a cutting table for an automated high temperature thermal cutting system (e.g., laser cutting system or plasma arc cutting system) can include the step of providing a computer-readable product including a library of part programs for a plurality of shapes. For example, a digital signal processor can receive at least one part program including data for at least one part to be cut from a workpiece (e.g., a library of part programs).

A user can be prompted to identify the shape of the at least one part to be cut from the workpiece, for example, either by prompting the user to select, input or identify the shape to be cut or by prompting the user to select a specific part program for the shape (e.g., using menu 250). The CPS can present at least one predetermined step that prompts the user to identify the shape of the at least one part to be cut from the workpiece. Any of the steps described herein can be presented to the user via a graphical user interface.

Figure 4:
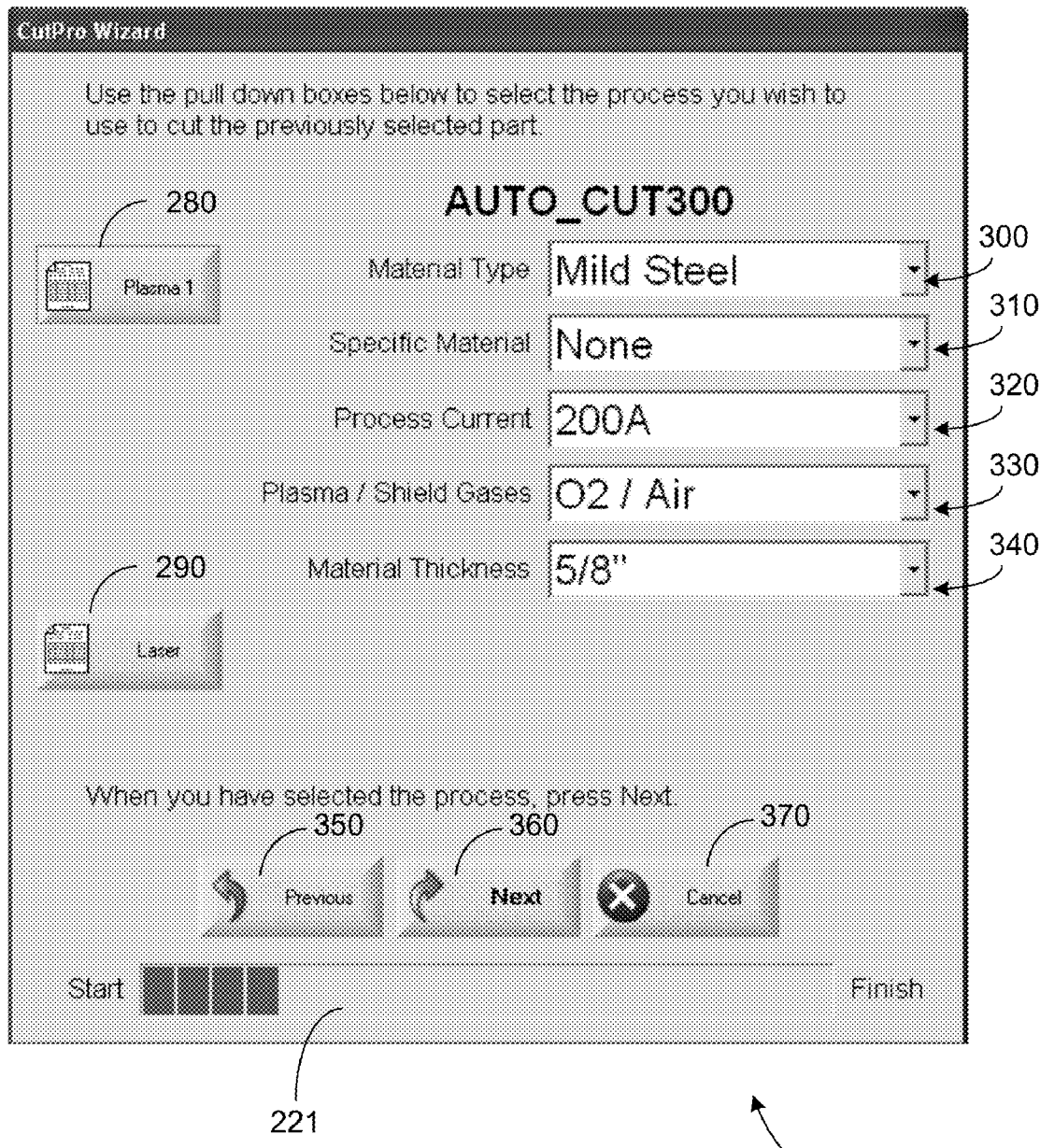
FIG. 4 shows an example of a user interface of a computer program system that prompts a user to identify operating parameters, according to an illustrative embodiment of the invention.

FIG. 4 shows an example of a user interface 270 (e.g., a graphical user interface) that prompts a user to identify operating parameters, according to an illustrative embodiment of the invention. The CPS can present the user (e.g., through a graphical user interface) with a series of operating parameters relating to selecting the type of cutting process. The CPS allows the user to configure different processes. For example, a cutting process for 200 amp, oxygen/air gases for a material thickness of ⅝" is displayed. Examples of other processes include 200 amp, O2/air, ½"; process 2 could be 260 amp, O2/O2, ½"; and process 3 could be a laser or water jet process, and the like. In some embodiments the user can select between configuring a laser cutting process or a plasma cutting process. The user can use feature 280 to configure operating parameters for a cutting process using a plasma cutting system or feature 290 to configure operating parameters for a cutting process using a laser cutting system. The CPS can provide/present to the user providing a series of pre-identified process parameters from memory. For example, the CPS can prompt the user to select values/options from a menu of operating parameters. The operating parameters can include, for example, a menu to select a material type 300 (e.g., mild steel), a menu to select a specific material 310 (e.g., a specific grade of steel), a menu to select an operating current 320 (e.g., process current for example, of 200 A), a menu to select a gas flow 330 (e.g., plasma/shield gas configuration) or a menu to select a thickness of the workpiece material 340. The CPS can also include a feature 350 for the user to go to a previous step (e.g., to reselect the part program), feature 360 to proceed to the next step in setting up the cutting system or a feature 370 to cancel setting up the cutting system.

In some embodiments, the CPS presents the user with an option to select the type of torch (not shown). The CPS can provide the user with a list of torch types (e.g., the T100M, FineCut, Max 200, and HySpeed, all available from Hypertherm, Inc. of Hanover, N.H.). The CPS can provide the user with a list of torches from different manufacturers. For example, the CPS can provide a list of torches manufactured by Hypertherm, Inc., a list of torches from manufacturers other than Hypertherm, Inc., or any combination thereof. In some embodiments, the CPS provides the user with a default torch type or the CPS can automatically detect the type of torch mounted in the automated high temperature thermal cutting system. In some embodiments, the CPS automatically selects the torch type to be used for the part to be cut (e.g., for the shape/selected piece to be cut) and prompts the user to confirm that the torch type identified by the part program is mounted in the cutting system. Alternatively, the computer program automatically selects the torch type from the most recent run (e.g., from a previous cut).

The CPS can present the user with an option to select the material type to be cut, for example, by prompting the user to select a value/option in menu 300 from a list or range of material types. By way of example only, the CPS can present the user with a list of material types (e.g., aluminum, steel, various stainless steels, titanium, bronze, etc.). The CPS can provide the user with a default material type. The CPS can automatically select the same material as the one selected or used in a previous run (e.g., a recent cut).

The CPS can present the user with an option to select the operating current (e.g., a process current), for example, by prompting the user to select a value/option in menu 320 from a range of operating currents. By way of example, the CPS can present the user with a range of operating currents (e.g., between about 40 A-200 A). In one embodiment, the CPS provides the user with a default operating current. The CPS can also automatically select the same operating current as the one selected from a previous run (e.g., a recent cut).

The CPS can present the user with an option to select the gas flow (e.g., a process gas composition), for example, by prompting the user to select a value/option in menu 330 from a list of available gas compositions. Where the high temperature thermal cutting system is a plasma cutting system, the CPS can allow the user to select a particular plasma gas and/or a shield gas. In some embodiments, the CPS allows the user to select a separate gas for the plasma and shield gases. The CPS can present the user with a list of gases (e.g., air, oxygen, nitrogen, argon, or hydrogen) to choose from. In some embodiments, the CPS provides the user with a default gas. The CPS can automatically select the same gas as the one selected from a previous run (e.g., a recent cut).

The CPS can present the user with an option to select the material thickness of the workpiece for example, by prompting the user to select values/options in menu 340 from a list of available thicknesses. For example, the CPS can present the user with a range of material thicknesses (e.g., between about 14 GA to over 3 inches). The CPS can provide the user with a default material thickness. In some embodiments, the CPS automatically selects the same material thickness as the one selected from a previous run (e.g., a recent cut).

In some embodiments, the CPS presents the user with an option to select the type of process to run. The user can decide whether to run a cutting process (e.g., cut a part from a workpiece) or a marking process (e.g., mark a workpiece). For example, the CPS allows the user to select a value or option from a list of processes (not shown). A marker cutting process can include applying a low current to the torch such that only an outline or etching of the shape is imprinted on the material. This can be used, for example, in testing to determine whether the torch has been properly set up. In some embodiments, the CPS presents the user with an option to select the type of cutting process, which can include plasma 1, plasma 2, water jet, laser, and/or oxy fuel. Examples of such process are described above. The system is sufficiently versatile for two different plasma processes for the same plasma system can be entered, or two different plasma process for two different plasma systems, e.g., using different consumable sets. The CPS can also provide the user with a default process type. In some embodiments, the CPS automatically selects the same process type as the one selected from a previous run (e.g., a recent cut).

In some embodiments, the CPS presents the user with all or some of the options listed above (e.g., torch type, material type, operating current, gas flow, thickness of the material/workpiece, type of process (e.g., cutting or marking)). The CPS can present the user with all of the options listed above on the same screen or menu in a graphical user interface. In some embodiments, the CPS presents the user with the options on different screens or menus. For example, the CPS can present a predetermined step prompting a user to select values from a menu of operating parameters, for example, by prompting the user to identify a first set of entries that include at least one of an operating current, a gas flow, a thickness of the workpiece or a material of the workpiece. The CPS can present a predetermined step prompting the user to identify a second set of entries including, for example, at least one of a type of high temperature thermal cutting system, a torch type or a consumable set. In some embodiments, the second predetermined step is presented to the user after the user has identified the first set of entries. In some embodiments, the CPS presents a help screen (not shown) to provide the user with information related to the selection of operating parameters.

Figure 5:
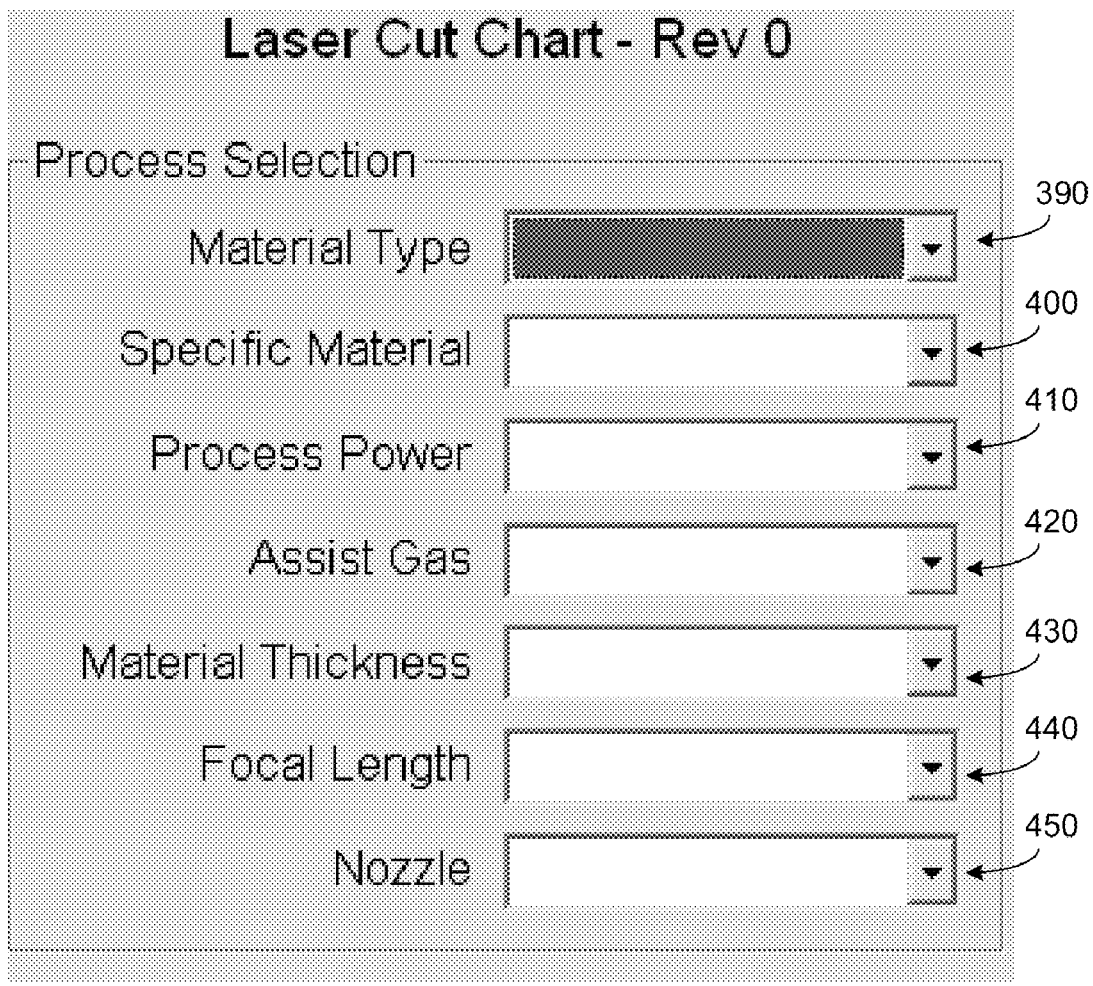
FIG. 5 shows an example of a user interface of a computer program system that prompts a user to identify operating parameters for a laser cutting system, according to an illustrative embodiment of the invention.

FIG. 5 shows an example of a user interface 380 (e.g., a graphical user interface) that prompts a user to identify operating parameters for a laser cutting system, according to an illustrative embodiment of the invention. The CPS can prompt a user to identify a set of entries that includes, for example, an assist gas composition, a focal length of a laser and/or a nozzle type. For example, the CPS can prompt a user to select values/options from a menu to select a material type 390, a menu to select a specific material 400, a menu to select a process power 410, a menu to select an assist gas composition 420, a menu of to select a workpiece thicknesses 430, a menu to select a focal length of a laser 440 and a menu to select a nozzle type 450.

The CPS can present the user with an option to select the material type to be cut, for example, by prompting the user to select values/options from a menu 390. In some embodiments, the CPS presents the user with a list of material types (e.g., aluminum, steel, various stainless steels, titanium, bronze, or many other types of materials). The CPS can also provide the user with a default material type (e.g., as specified by a part program). In some embodiments, the CPS automatically selects the same material as the one selected from a previous run (e.g., a recent cut).

The CPS can also prompt the user to select a value/option from a menu of specific material types 400. The CPS can present the user information associated with different types of materials. The information associated with the type of material can include operating parameter modifications based on, for example, trial and error. The user can modify operating parameters based on the grade, manufacturer, or composition of the material type to be processed. The CPS can allow the user to modify or add information about the material type. For example, the CPS can present the user with a list of material types, for example, an electronic library of steel manufacturers including, e.g., KSK, a division of Nippon Steel (Japan), and IPSCO (now SSAB of Stockholm, Sweden), as this can affect the preferred operating parameters for the cutting system. The CPS can also provide the user with a default material type. In some embodiments, the CPS automatically selects the material type based on the material type selected from a previous run (e.g., a recent cut).

The CPS can present the user with an option to select the operating power for the power supply, for example, by prompting the user to select values/options from a menu 410 including a list/range of power levels. For example, the CPS can present the user with a list of power levels (e.g., between about 1,000 W and 6,000 W). The CPS can provide the user with a default power level. In some embodiments, the CPS automatically selects the same power level as the one selected from a previous run (e.g., a recent cut).

In some embodiments, the CPS presents the user with an option to select the assist gas, for example, by prompting the user to select values/options from a menu 420 including a list/range of assist gases. For example, the CPS can present the user with a list of assist gases (e.g., nitrogen and oxygen). In one embodiment, the CPS provides the user with a default assist gas. The CPS can automatically select the same assist gas as the one selected from a previous run (e.g., from a prior cut).

In laser embodiments of the invention, the CPS can present the user with an option to select the focal length of the laser from an electronic library for example, by prompting the user to select values/options from a menu 440 including a list/range of focal lengths. The focal length can be defined as the distance from the lens to the plate. In some embodiments, the focal length is 10 inches. The focal length can depend on, for example, the lens, power, and material thickness. The CPS can prompt a user to identify a focal length from a list of possible focal lengths. In one embodiment, the CPS provides the user with a default focal length. In some embodiments, the CPS automatically selects the same focal length as the one selected from a previous run (e.g., a previous cut).

The CPS can present the user with an option to select the nozzle type for example, by prompting the user to select values/options from a menu 450 including a list/range of nozzle types. For example, the CPS can present the user with a list of nozzle types, including, for example, nozzles having a diameter of between 100 µm to 1.5 mm. In one embodiment, the CPS provides the user with a default nozzle type. In some embodiments, the CPS automatically selects the same nozzle type as the one selected from a previous run (e.g., a recent cut).

In some embodiments, the CPS presents the user with all of the options listed above (e.g., material type, detailed information relating to material type, operating power, assist gas, focal length, nozzle type). For example, the CPS can present the user with all of the options listed above on the same screen or menu or in different screens or menus. The CPS can present a help screen to provide the user with information related to selecting operating parameters for a laser cutting system.

The CPS can prompt the user to select values/options for mandatory operating parameters, such as, an operating current, a gas flow, a thickness of the workpiece or a material of the workpiece. At least one predetermined step can be presented to a user to select values from a menu of mandatory operating parameters for a shape of the at least one part to be cut. Mandatory operating parameters (e.g., a series of pre-identified operating parameters) can be defined as the minimal number of parameters that should be defined prior to commencing cutting a part from a workpiece, thereby minimizing the selections required to be determined by the user and providing guidance to a novice user. The mandatory operating parameters can be identified by a user selecting values/options from a menu of mandatory operating parameters.

The values for the mandatory operating parameters can also be specified by the part program. For example, in some embodiments, a part program that includes data for at least one part to be cut from a workpiece specifies a material type of the workpiece and a thickness of the workpiece. The CPS can present predetermined steps to a user, such as prompting the user to load and align a workpiece having the material type and the thickness as specified by the part program. For example, the material type of the workpiece can be mild steel and the thickness of the workpiece is ½ inch. The user can be prompted to load and align a ½ inch thick steel workpiece in the high temperature thermal cutting system. The CPS can also prompt the user to select values from a menu of mandatory operating parameters (e.g., operating current or a gas flow) not specified by the part program.

The CPS can prompt the user to identify the shape of the part to be cut before prompting the user to select values/options for the mandatory operating parameters. The CPS can prompt the user to select values from a menu of operating parameters, such as, a torch type and a consumable set (e.g., consumable set corresponding to an identified operating current) or consumable type. The CPS can also prompt the user to load a consumable type for an identified torch type. The CPS can provide a bar code or identification number to the user identifying a corresponding workpiece having the material type and the thickness as specified by the part program (e.g., thereby prompting the user to load the workpiece bearing and/or identified by the corresponding bar code and/or identification number). In some embodiments, the part program specifies a consumable type to be loaded in the high temperature thermal cutting system. The CPS can present a predetermined step to a user that prompts the user to load the consumable type specified by the part program.

A method for setting up a cutting table for an automated high temperature thermal cutting system can include providing a computer-readable product (e.g., CPS) including data for at least one part to be cut from a workpiece. The method can also include the step of prompting a user to select values from a menu of mandatory operating parameters for a shape of the at least one part to be cut from the workpiece. The mandatory operating parameters can include at least one of an operating current, a gas flow, a thickness of the workpiece or a material of the workpiece. The user can select values from the menu of mandatory operating parameters using a graphical user interface. The method can also include prompting the user to select values from a menu of operating parameters that include at least one of a type of high temperature thermal cutting system, a torch type or a consumable set.

Figure 6:
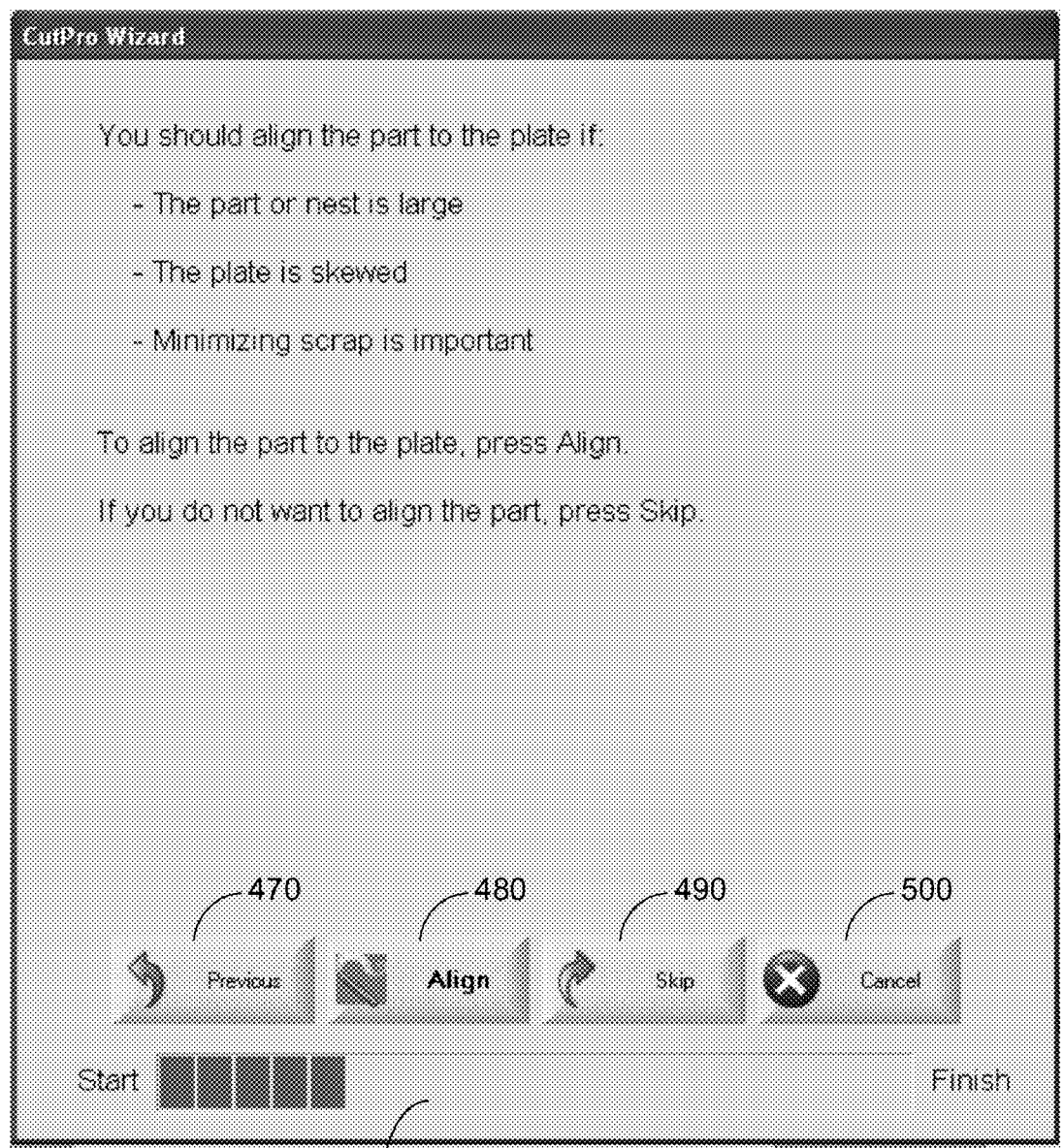
FIG. 6 shows an example of a user interface of a computer program system relating to an alignment of a workpiece in an automated high temperature thermal cutting system, according to an illustrative embodiment of the invention.

FIG. 6 shows an example of a user interface 460 relating to an alignment of a workpiece in an automated high temperature thermal cutting system, according to an illustrative embodiment of the invention. The CPS can include a feature to go back to a previous step 470 (e.g., to select a part program or select/identify values for operating parameters as shown in FIGS. 3-5), a feature to start the process of aligning the workpiece 480 with the torch (e.g., either to trigger the process to manually align or to command an automatic sensor to scan the workpiece), a feature to skip the step of alignment 490 and the feature to cancel the process of setting up the cutting system 500.

A workpiece (e.g., plate) should be aligned if the part or nest of parts to be cut from a workpiece is large (e.g., if the part is large in size or if there are a great number of parts to be cut from the workpiece). The workpiece should also be aligned if the workpiece is skewed and also to minimizing the part clearance (e.g., a distance between parts). In some embodiments, the user does not have to align the part, and the CPS will prompt the user (e.g., in a graphical user interface) to choose whether to proceed with alignment or to skip alignment.

A workpiece can be automatically aligned or manually aligned by a user. An auto align sensor can be used to scan the workpiece to automatically determine the alignment of the workpiece. A method for setting up a cutting table for an automated high temperature thermal cutting system can include prompting the user to manually align the workpiece. A starting point to cut a part from the workpiece can be selected based on an alignment of the workpiece.

Figure 7:
FIG. 7 shows an example of a user interface of a computer program system relating to an alignment of a workpiece in a laser cutting system, according to an illustrative embodiment of the invention.

FIG. 7 shows an example of a user interface 510 (e.g., a graphical user interface) for a CPS that relates to an alignment of a workpiece in a laser cutting system, according to an illustrative embodiment of the invention. A workpiece can be aligned in different ways. For example, a workpiece can be aligned using a laser pointer or using the torch itself. Where the high temperature thermal cutting system is a laser cutting system, a laser pointer is used as a reference to align the torch head. The CPS can prompt the user to align the torch alignment using a laser pointer or using the torch head. The CPS can include a feature to back to a previous step 520 (e.g., steps described above in FIGS. 3-6), align the workpiece using the laser pointer 530, a feature to align the workpiece using the torch 540, and a feature to cancel the process of setting up the cutting system 550.

Figure 8:
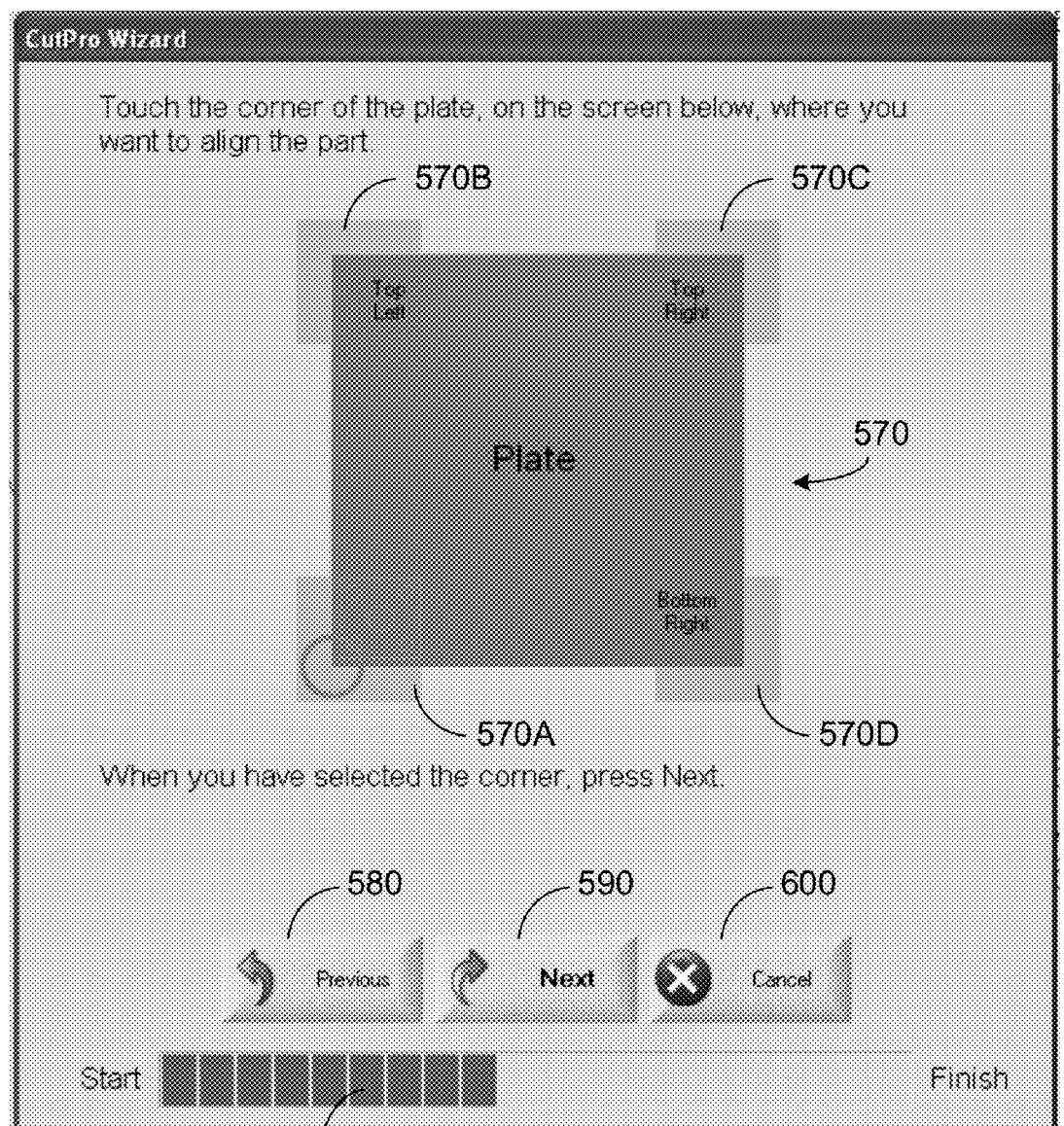
FIG. 8 shows an example of a user interface of a computer program system for aligning a workpiece in an automated high temperature thermal cutting system, according to an illustrative embodiment of the invention.

FIG. 8 shows an example of a user interface 560 (e.g., a graphical user interface) for aligning a workpiece in an automated high temperature thermal cutting system, according to an illustrative embodiment of the invention. The user can be prompted to manually align the workpiece. Alignment can be based on, for example, two corners of a workpiece, a corner of a workpiece and an edge of the workpiece, auto-alignment based on sensors that scan the workpiece and determine the orientation. The alignment can be used to select the starting point to cut the at least one part from the workpiece. The alignment of the workpiece can be based on a corner of a cutting table for the high temperature thermal cutting system and at least one edge of the workpiece. The CPS can include a feature 570 that permits a user to select a corner of the workpiece for torch alignment (e.g., to align the workpiece). For example, the CPS allows the user to select the alignment corner by clicking/inputting the location on the screen (e.g., feature 570A corresponding to the bottom left corner, feature 570B corresponding to the top left corner, feature 570C corresponding to the top right corner, and feature 570D corresponding to the bottom right corner). The CPS can provide the user with a default alignment corner. The CPS can automatically select the same alignment corner as the one selected from a previous run (e.g., a previous cut). The CPS also can include a feature to go back to a previous step 580 (e.g., as described in FIGS. 3-8), a feature to proceed to the next step 590, or a feature to cancel the process of setting up the cutting system 600.

The CPS can also prompt the user to select a second point of the workpiece for torch alignment (e.g., a second alignment point). The user can use feature 570 to click/input a location on the screen to select the second point of the workpiece. The CPS can provide the user with a default second point. The CPS can automatically select the same second alignment point as the one selected from a previous run (e.g., a recent cut).

In some embodiments, the CPS prompts the user to enter in the length and/or width of the workpiece. The CPS can present the user with a list of lengths and/or widths of standard workpieces (not shown). The CPS can present the user with a default length and/or width. In some embodiments, the CPS automatically selects the length and/or width of the workpiece from the data entered in a previous run (e.g., a recent cut). In some embodiments, the CPS provides a help screen to provide the user with information related to the alignment process (not shown).

Figure 9:
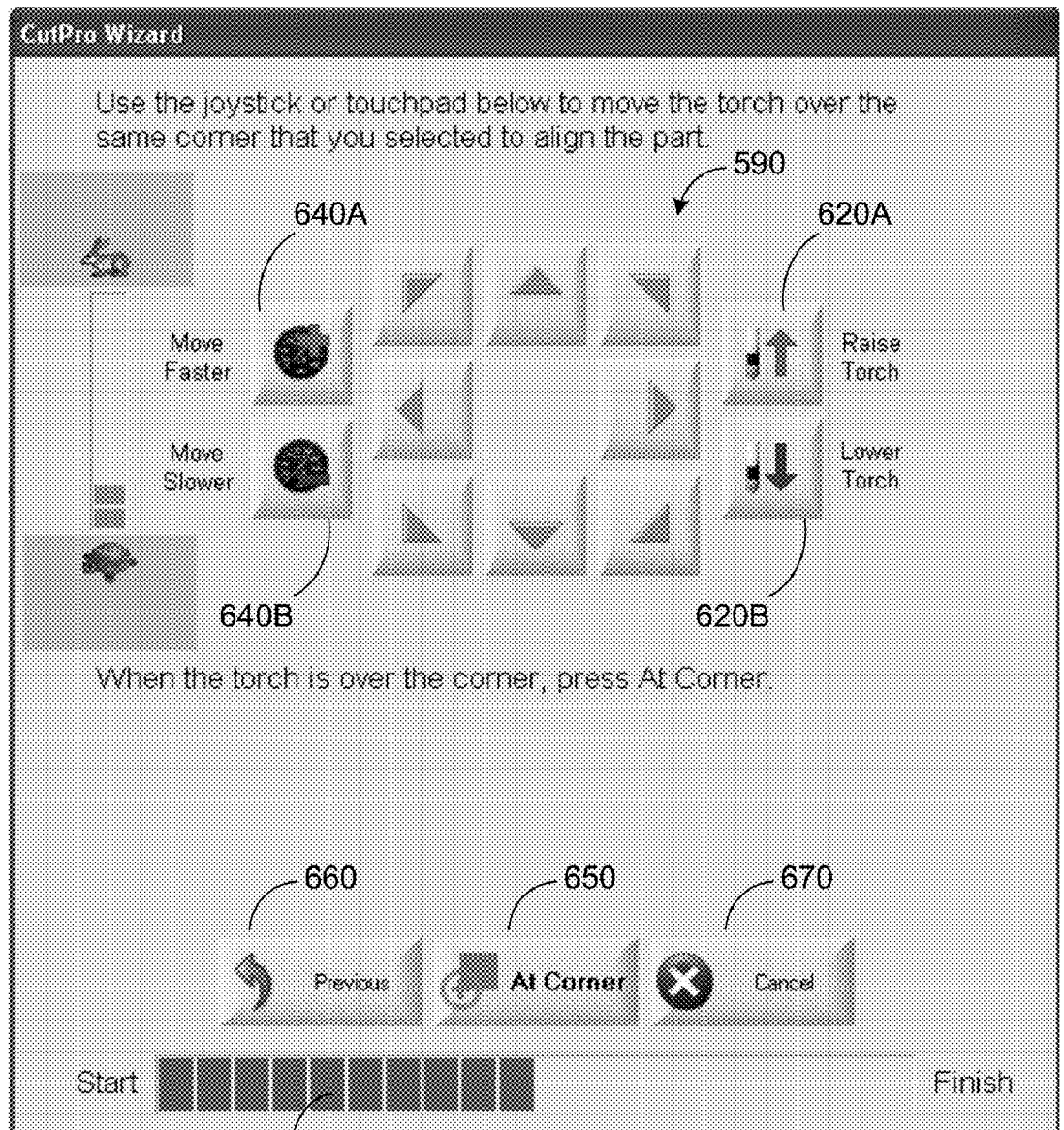
FIG. 9 shows an example of a user interface of a computer program system for aligning a workpiece in an automated high temperature thermal cutting system, according to another illustrative embodiment of the invention.

FIG. 9 shows an example of a user interface 610 (e.g., a graphical user interface) for a CPS for aligning a workpiece in an automated high temperature thermal cutting system, according to another illustrative embodiment of the invention. In some embodiments, the CPS allows the user to align the torch with a point on the workpiece. The CPS can provide the user with controls to move the torch directly over the alignment point. The CPS can include features 620A to raise the torch head, feature 620B to lower the torch head (e.g., through a torch height control 150 as shown in FIG. 1), feature 630 to move the torch head up, down, left, right, and diagonally. The CPS can also include feature 640A to move the torch head faster and feature 640B to move the torch head slower. Once the user has moved the torch using features 620A-B, 630, and 640A-B, the user can indicate that the torch is over the alignment point by using feature 650. The CPS can automatically align the torch to the alignment point. The CPS can also include feature to go to a previous step 660 or a feature to cancel the process of setting up the cutting system 670.

In some embodiments, the CPS provides a laser pointer that can be automatically turned on by the digital signal processor based on instructions in the CPS. The laser pointer can have a pre-defined offset. In some embodiments, the CPS uses a laser pointer to align the torch with a point on the workpiece. The CPS can use the torch center point to align the torch with a point on the workpiece. In some embodiments, the CPS provides a help screen (not shown) to provide the user with information related to the alignment process.

In some embodiments, the CPS provides the user with the option of moving the torch faster or slower than the current speed (e.g., via features 640A-640B). The CPS can also provide the user with the option of raising or lowering the torch height (e.g., via features 620A and 620B).

Figure 10:
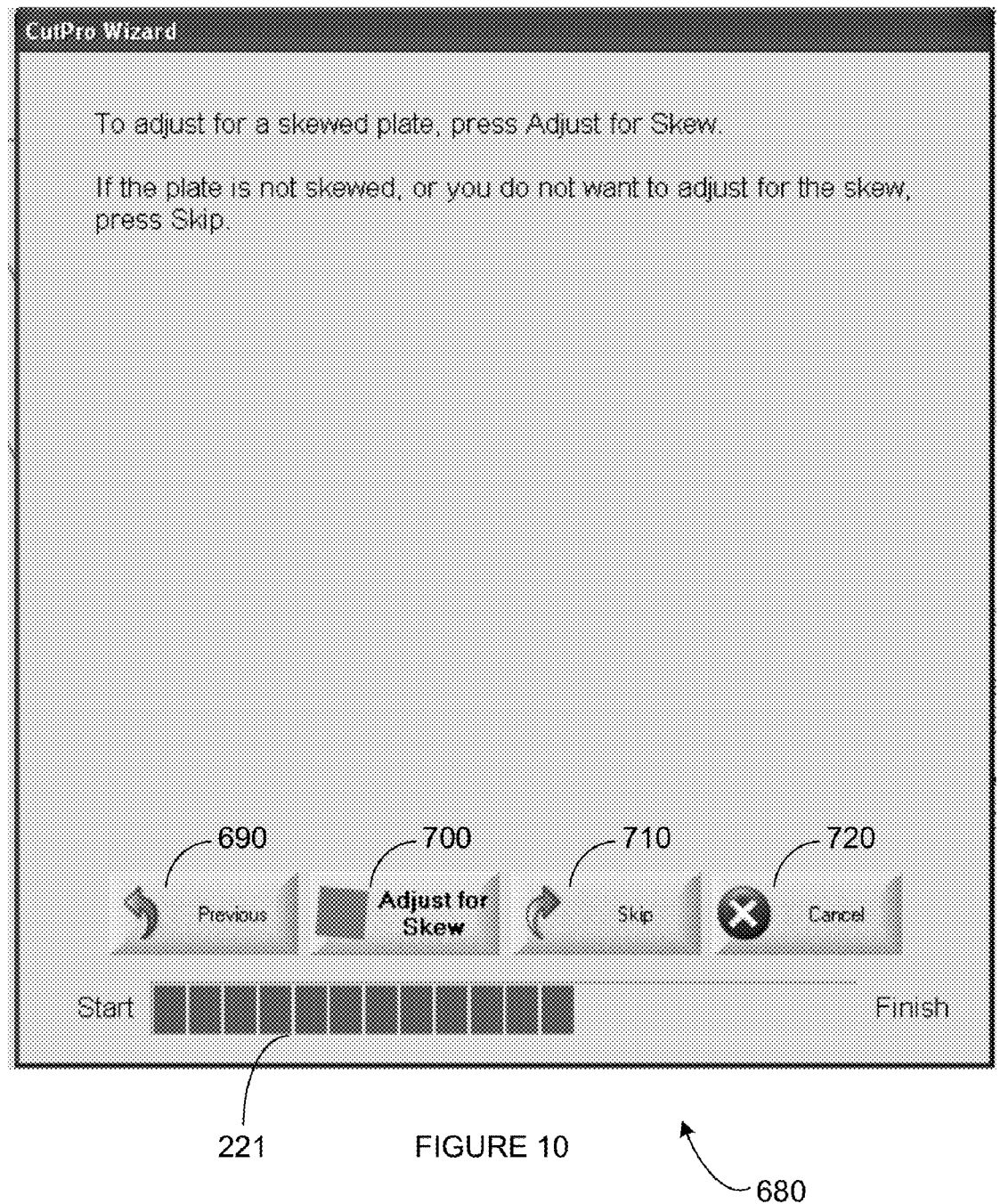
FIG. 10 shows an example of a user interface of a computer program system for adjusting for skew, according to an illustrative embodiment of the invention.

FIG. 10 shows an example of a user interface 680 (e.g., a graphical user interface) for adjusting for skew, according to an illustrative embodiment of the invention. Adjusting for skew (e.g., compensating for skew) allows the part to fit properly on a workpiece (e.g., a plate) when aligning the workpiece. Adjusting for skew can be desirable when a nest of parts are being cut from a workpiece, where there may be little room for error. The CPS can present the user with the option to align the torch with a point on the workpiece to adjust for skew of the workpiece. The CPS can include a feature for the user to go to a previous step 690, a feature for the user to proceed with adjusting for skew 700, a feature for the user to skip the step of adjusting for skew 710 or a feature for the user to cancel the process of setting up the cutting system 720. For example, if the user knows that the skew for the present piece is the same as the previous, the CPS can use the previous skew setting. Alternatively, a stored value in the CPS can cause it to behave as if there is no skew (i.e., the workpiece is parallel to the edges of the cutting table) if no value is entered or determined.

Figure 11:
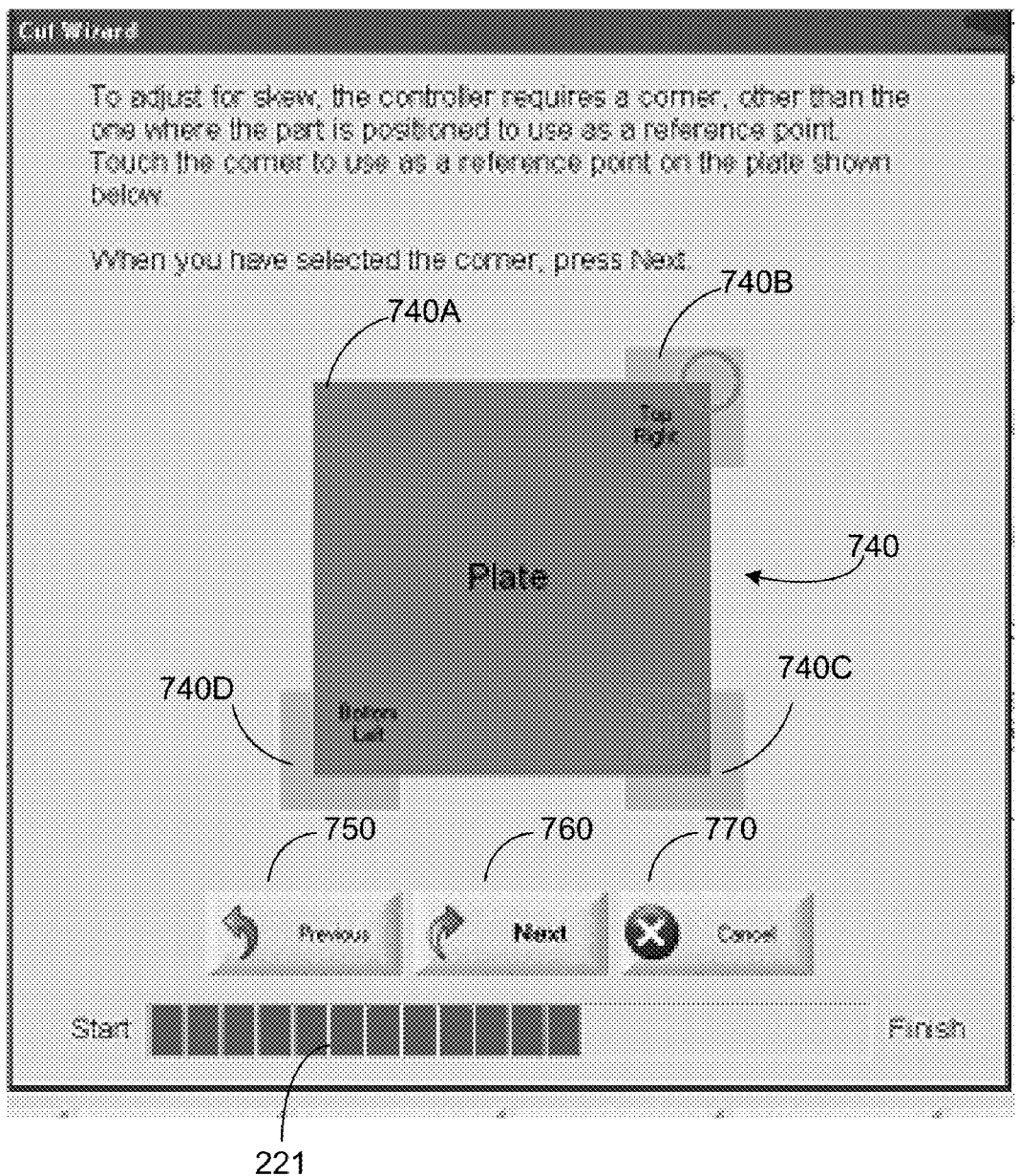
FIG. 11 shows an example of a user interface of a computer program system for adjusting for skew, according to another illustrative embodiment of the invention.

FIG. 11 shows an example of a user interface 730 (e.g., a graphical user interface) for adjusting for skew, according to another illustrative embodiment of the invention. The skew-adjustment process can occur in a similar way as the alignment process as described above. The CPS can include a feature 740 where the user can click on the screen to select a corner (e.g., other than the corner where the part is positioned as a reference point). For example, if corner corresponding to location 740A is used as a reference point, the user can click/choose corners 740B-D on the screen to choose a corner of the workpiece. The CPS can include a feature for the user to go to a previous step 750, a feature for the user to proceed to the next step in setting up the cutting system 760, and a feature to cancel the process of setting up the cutting system 770.

In some embodiments, the CPS uses a laser pointer to align the torch with a point on the workpiece. The CPS can use the torch center point to align the torch with a point on the workpiece. The CPS can provide a help screen (not shown) to provide the user with information related to skew adjustment.

Figure 12:
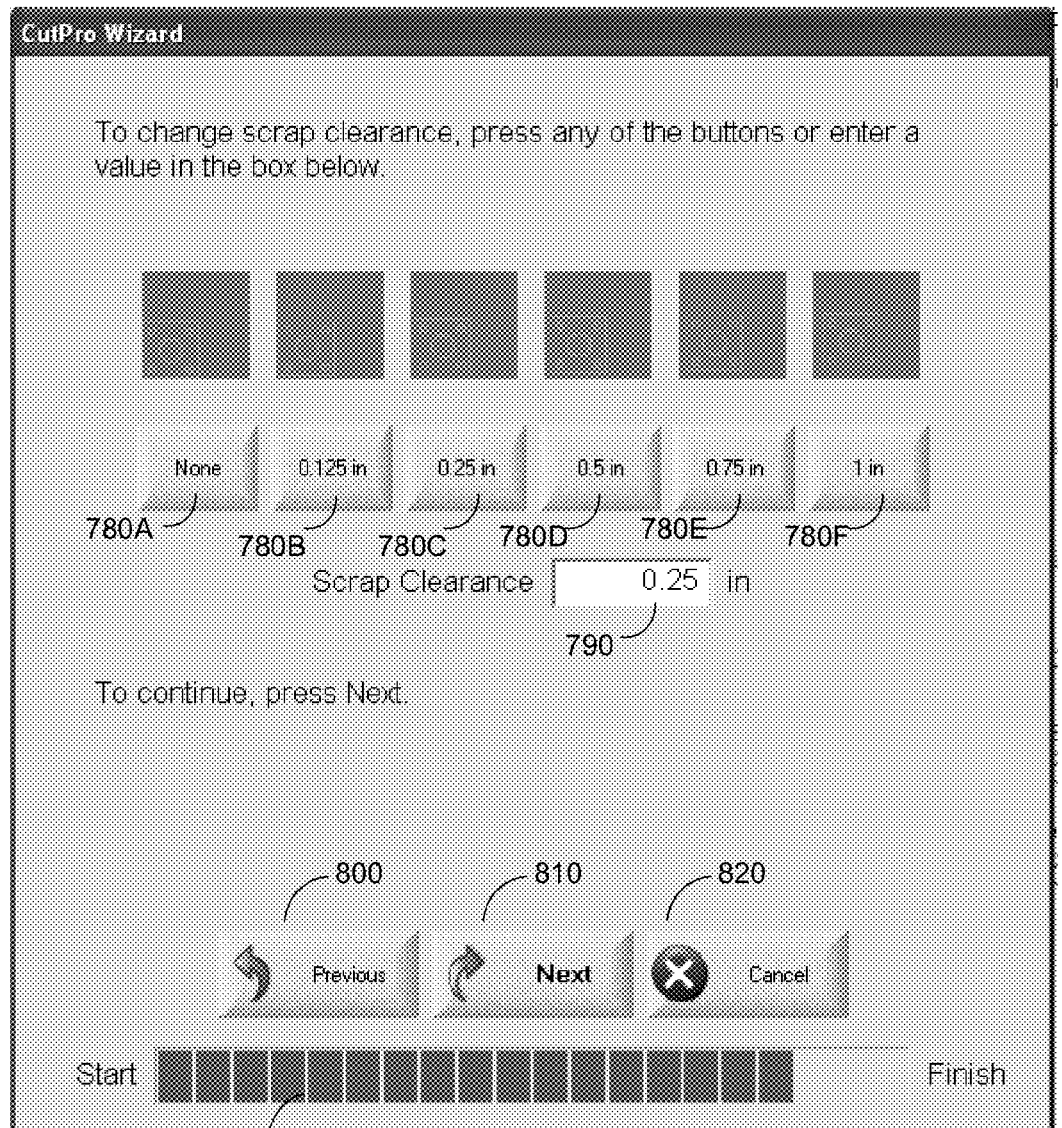
FIG. 12 shows an example of a user interface of a computer program system relating to part clearance, according to an illustrative embodiment of the invention.

FIG. 12 shows an example of a user interface 779 (e.g., a graphical user interface) relating to part clearance (e.g., scrap clearance), according to an illustrative embodiment of the invention. A user can be prompted to select a part clearance around edges of the work piece. The part clearance is defined as the amount of material between the part to be cut and the edges of the workpiece. The CPS can present a user with the option to input the part clearance for the shape to be cut. CPS can prompt a user to select values from a menu (e.g., comprising features 780A-780F) corresponding to ranges of part clearances. The CPS can include features 780A-780F corresponding to different levels of part clearance that the user can choose from. The CPS can present the user with a range of part clearance (e.g., between about 0-1 inch). For example, the user can use feature 780A to specify no part clearance, feature 780B to specify 0.125 inches of part clearance, feature 780C to specify 0.25 inches of part clearance, feature 780D to specify 0.5 inches of part clearance, 780E to specify 0.75 inches of part clearance and 780F to specify 1 inches of part clearance. The CPS can also prompt the user to manually input the part clearance. The CPS can include a feature 790 where the user manually inputs a value for the part clearance. The CPS can include a feature for the user to go to a previous step 800, a feature for the user to proceed to the next step in setting up the cutting system 810, and a feature to cancel the process of setting up the cutting system 820.

The CPS can also provide the user with a default part clearance. In some embodiments, the CPS automatically selects the same part clearance as the one selected from a previous run (e.g., a recent cut). The CPS can also present an optimal part clearance based on the shape of the part to be cut (e.g., the shape selected by the user). The optical part clearance can allow the greatest number of shapes can be cut on a workpiece. In some embodiments, the CPS provides a help screen to provide the user with information related to part clearance.

Figure 13:
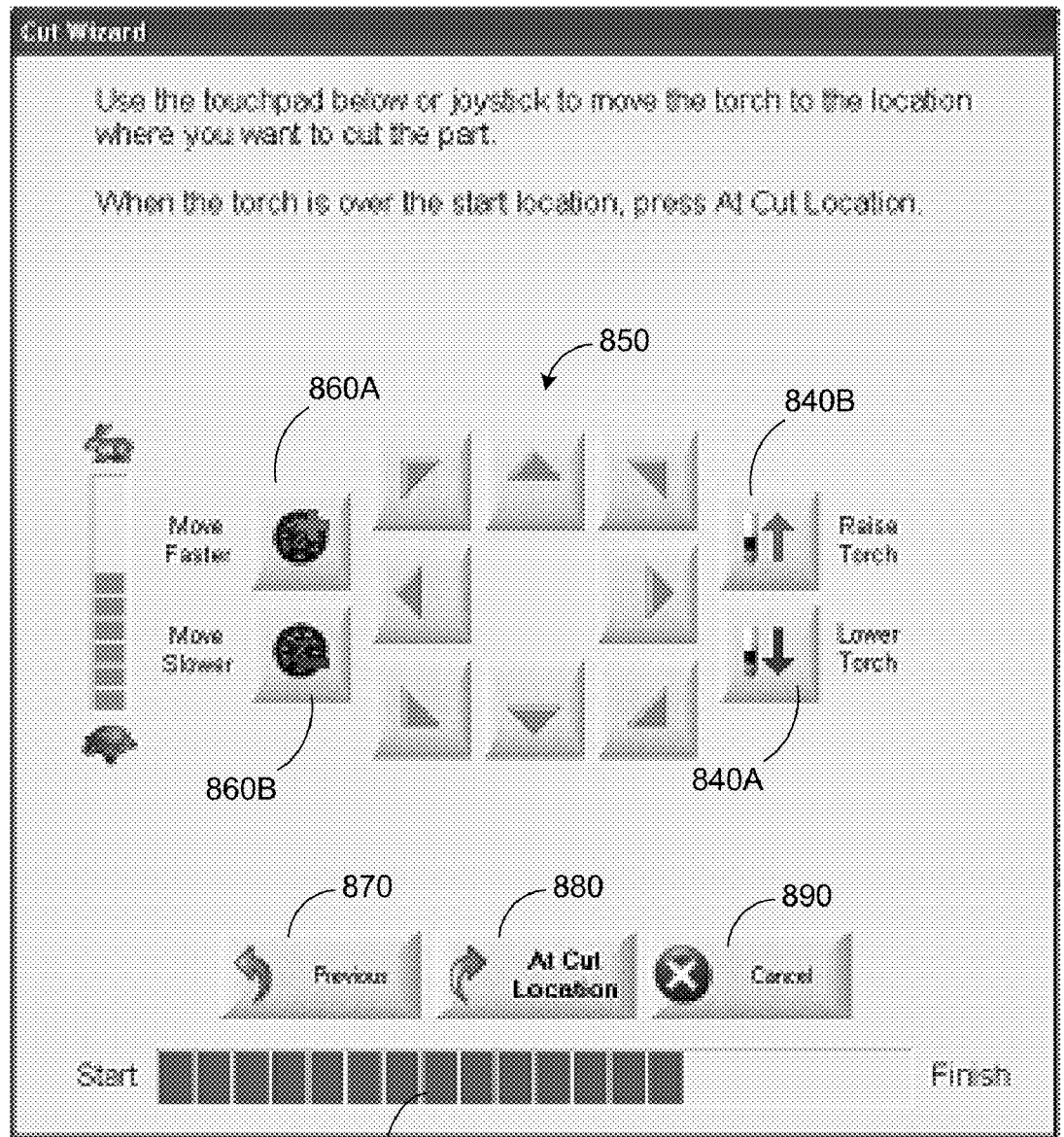
FIG. 13 shows an example of a user interface of a computer program system for selecting a starting point, according to an illustrative embodiment of the invention.

FIG. 13 shows an example of a user interface 830 (e.g., a graphical user interface) for selecting a starting point, according to an illustrative embodiment of the invention. The user can, using the CPS, raise or lower the torch height. For example, user can raise the torch using feature 840B and lower the torch using feature 840A. The CPS can allow the user to select a starting point (e.g., allow the user to move the torch to a desired process starting location). For example, CPS can include features 850 to move the torch up, down, left, right, and diagonally. The CPS can provide the user with the option of accelerating or decelerating the torch. For example, the user can move the torch faster using feature 860A and move the torch more slowly using feature 860B. The CPS can include a feature for the user to go to a previous step 870, a feature for the user to proceed to the next step in setting up the cutting system 880, and a feature to cancel the process of setting up the cutting system 890. The starting point can be selected when the plate (workpiece) is first aligned. Where alignment information is not required (as described above), the starting point can be selected independent of the alignment function.

In some embodiments, the CPS presents a help screen to provide the user with information related to the alignment bypass screen. The CPS can also give the user an option to bypass alignment (e.g., as discussed in FIGS. 6-9) and skew adjustment (e.g., as discussed in FIGS. 10-11) and proceed directly to cutting.

Figure 14:
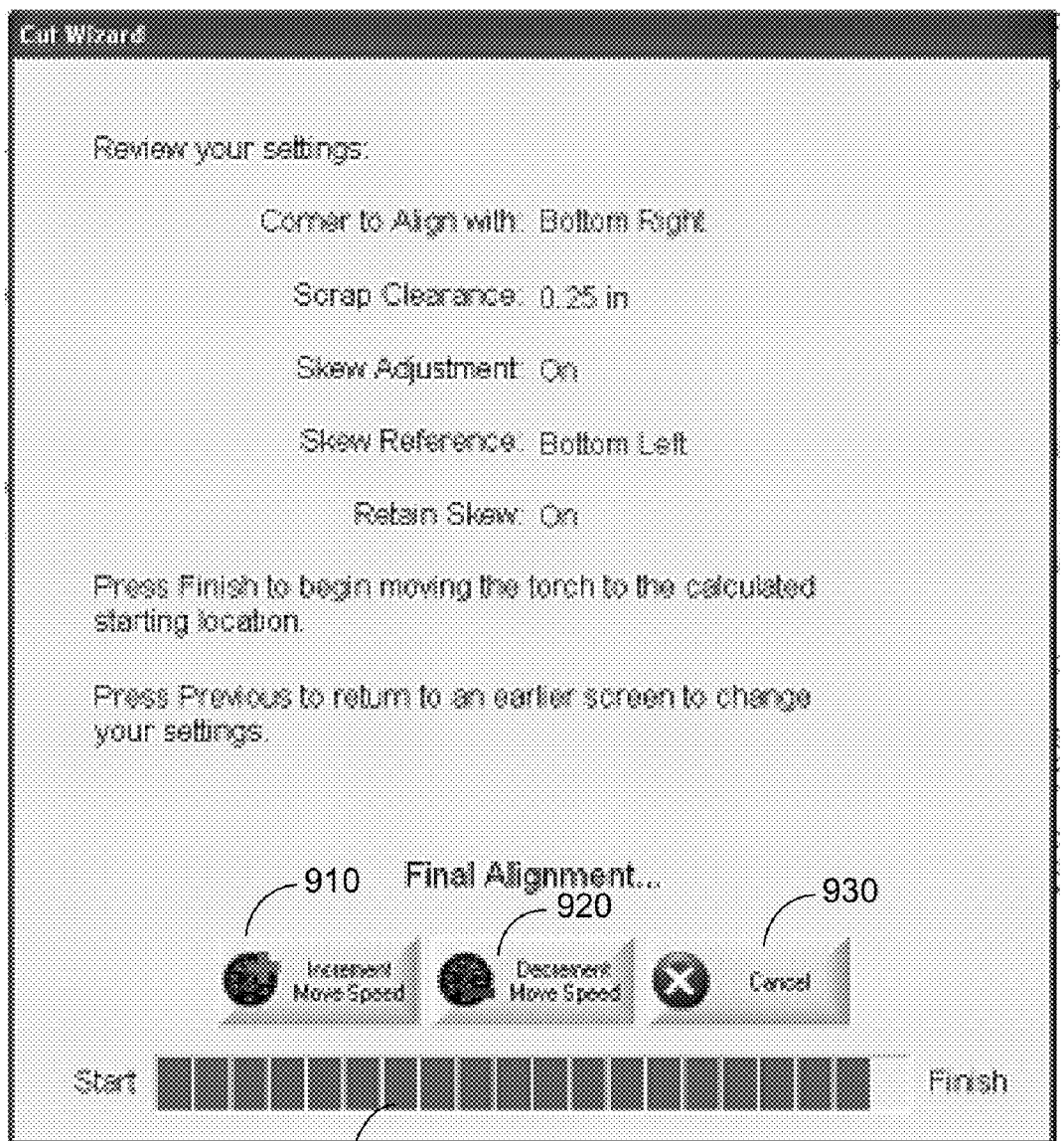
FIG. 14 shows an example of a user interface of a computer program system for reviewing operation settings for an automated high temperature thermal cutting system, according to an illustrative embodiment of the invention.

FIG. 14 shows an example of a user interface 900 (e.g., a graphical user interface) for reviewing operation settings for an automated high temperature thermal cutting system, according to an illustrative embodiment of the invention. The CPS can present a user with a summary of the alignment related operating parameters (e.g., an alignment, skew, and/or part clearance selections). A setting review can be presented to the user which can include, for example, at least the mandatory operating parameters (e.g., an operating current, a gas flow, a thickness of the workpiece or a material of the workpiece identified by the user from the first set of entries. The user can use controls from the CPS (e.g., as discussed in FIG. 13) to move the torch directly over a location on the workpiece to begin cutting (e.g., to select a starting point). The user can, using the CPS, move the torch faster or slower than the current speed. For example the user can use feature 910 to move the torch faster and feature 920 to move the torch slower. The CPS can include a feature 930 for the user to cancel the process of setting up the cutting system.

In some embodiments, the CPS provides the user with the option of raising or lowering the torch height (not shown). The CPS can allow the user to align the torch with another point on the workpiece. In some embodiments, the CPS presents a help screen (not shown) to provide the operator with information related to the alignment summary screen.

Figure 15:
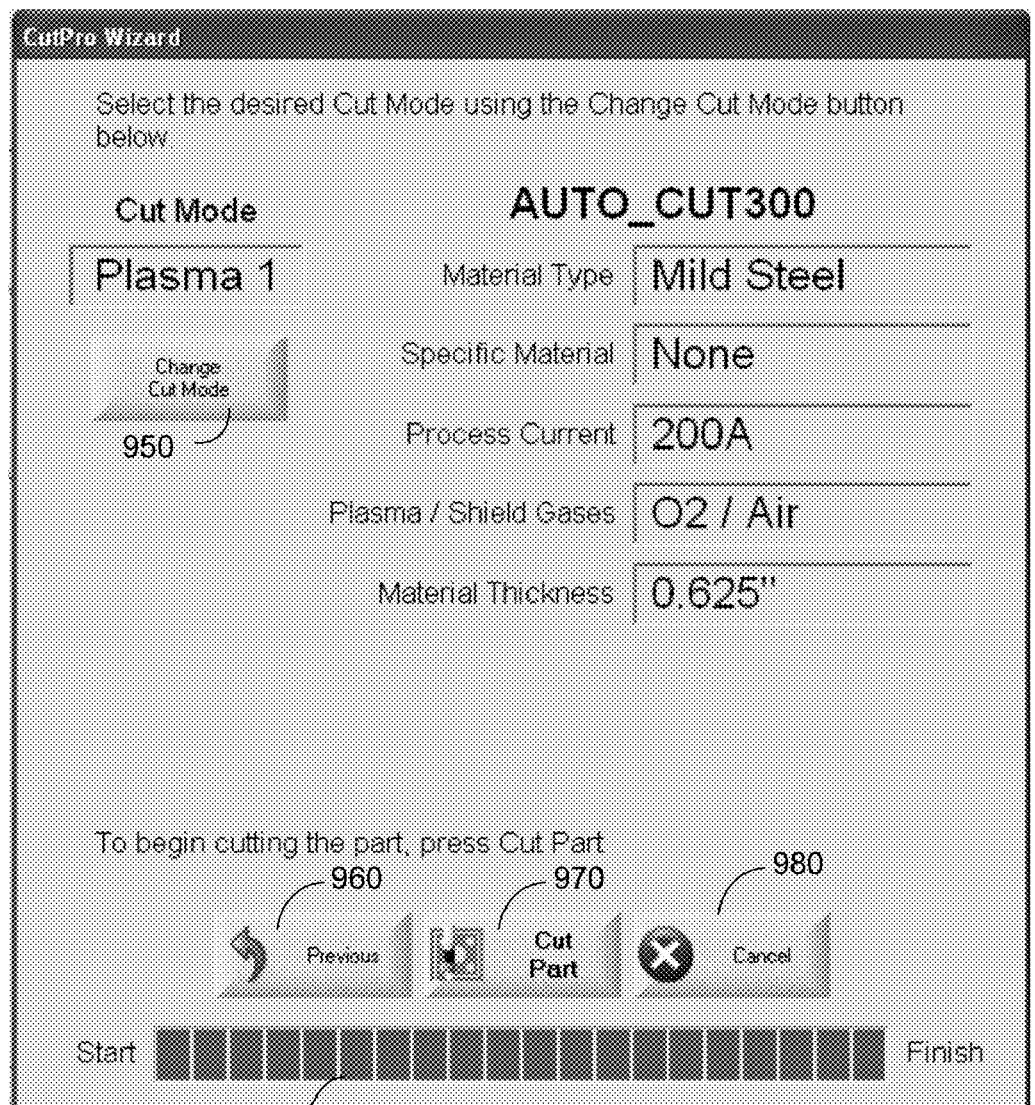
FIG. 15 shows an example of a user interface of a computer program system for reviewing operation settings for an automated high temperature thermal cutting system, according to an illustrative embodiment of the invention.

FIG. 15 shows an example of a user interface 940 (e.g., a graphical user interface) for reviewing operation settings for an automated high temperature thermal cutting system, according to an illustrative embodiment of the invention. The CPS can present a user with a summary of the operating parameters that were selected by the user or specified by, for example, the part program. The CPS can allow the user to change the selections on the summary screen (e.g., change the operating parameters with feature 950). The CPS can include a feature 950 to go to a previous step (e.g., as those described in FIGS. 3-14) that presents the user with the option of returning to previous screens to change a selection. Once the user has reviewed the settings and/or confirmed that the cutting system is set up according to the operating parameters identified in the summary of operating parameters 940, the CPS includes a feature 970 that allows the user to begin cutting the part. The CPS can include a feature 980 for the user to cancel the process of setting up the cutting system. In some embodiments, the CPS presents a help screen (not shown) to provide the user with information related to the screen summarizing the operating parameters.

Figure 16A:
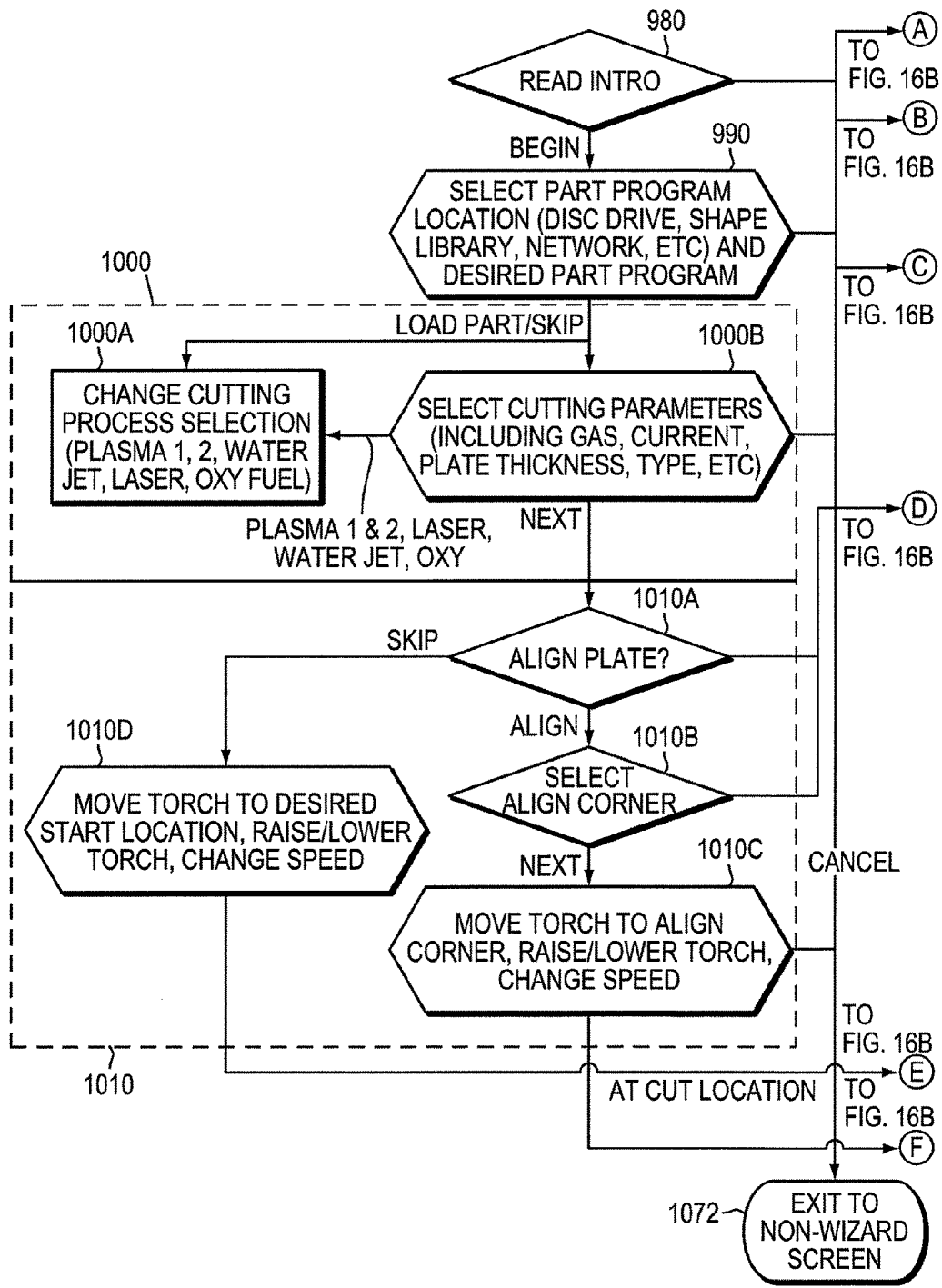
FIG. 16A shows a flow chart for programming an automated high temperature thermal cutting system, according to an illustrative embodiment of the invention.
Figure 16B:
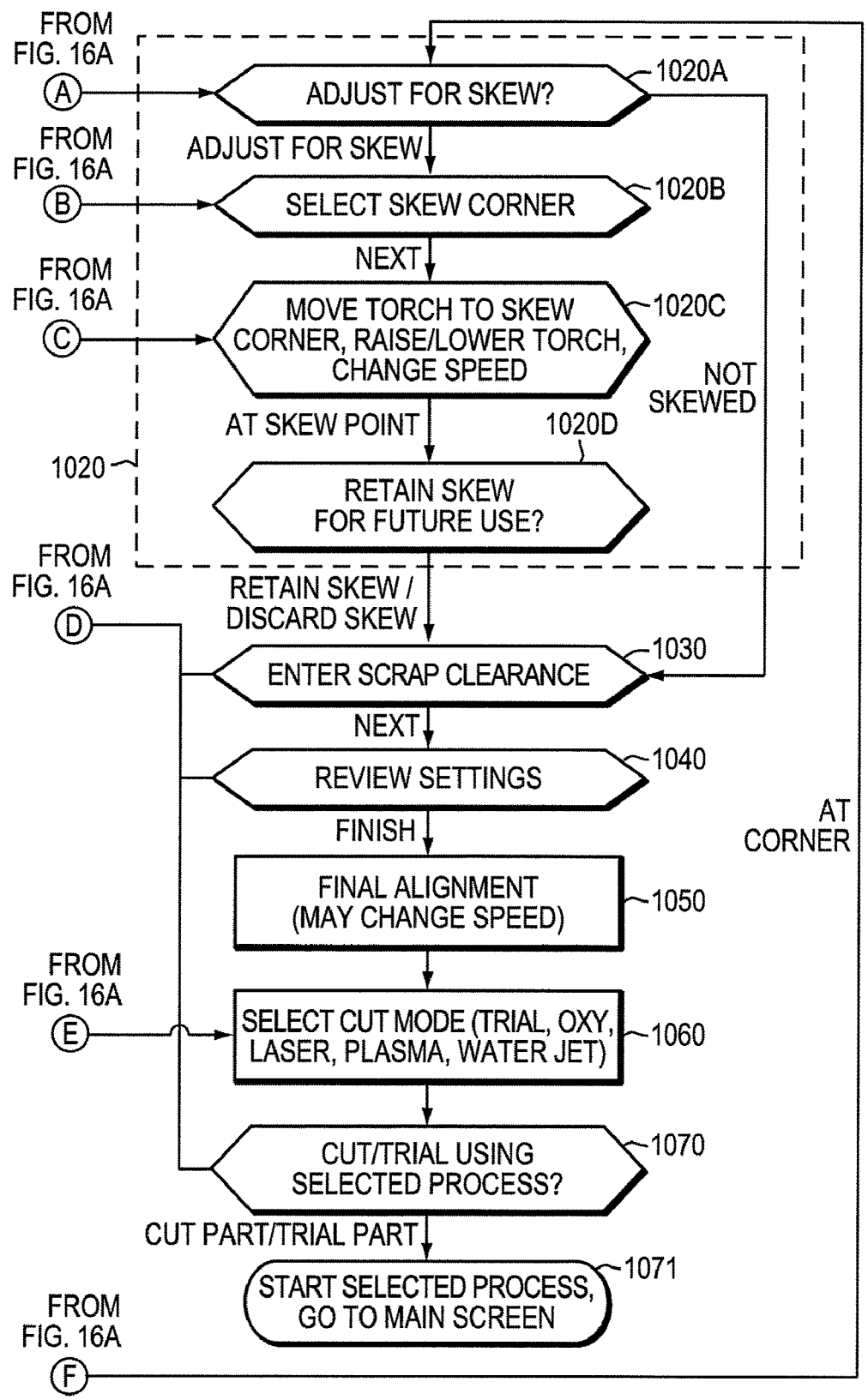
FIG. 16B shows a flow chart for programming an automated high temperature thermal cutting system, according to an illustrative embodiment of the invention.

FIGS. 16A-16B show a flow chart for programming an automated high temperature thermal cutting system, according to an illustrative embodiment of the invention. The CPS can include different modules. For example, the CPS can include an introduction module 980, a part selection module 990, an operating parameter selection module 1000, an alignment module 1010, a skew adjustment module 1020, a part clearance module 1030, a review settings module 1040, a final alignment module 1050, a select cut module 1060, a confirmation module 1070 and/or a help module. The CPS can allow a user to go back to any previous steps and/or previous modules. In some embodiments, the CPS includes a module 1071 that allows the user to select a starting point to cut at least one part from the workpiece (e.g., as shown in FIG. 13). The CPS can also include a module 1072 that allows the user to exit the computer program (e.g., exit the cutting wizard, for example, if the user chooses to configure the cutting system without the use of the CPS).

An introduction module 980 of the CPS can be used to present the user with an introduction screen, in for example, a graphical user interface (e.g., as described in FIG. 2). The introduction module 980 can present the user with the option to begin the process of configuring a digital signal processor, such as a CNC for a plasma arc system.

The part selection module 990 of the CPS allows the user to select a part program. For example, the CPS can present the user with an electronic library of shapes or parts and allow the user to select the desired part program (e.g., as described in FIG. 3). The library can be stored locally, remotely, in a network, in a wireless network, or in a portable storage device, such as a thumb drive. Library information can transmitted electronically, such as by email, from a designer to a cutting shop. The part selection module 990 can allow the user to load a shape or part from outside the library. In some embodiments, the CPS allows the user to select the location of the file to be loaded. For example, the user can use a part program stored on a CD-ROM or a USB device. The CPS allows the user to select the part program from the CD-ROM or USB device and load the part program into the digital signal processor (e.g., CNC).

The operating parameter selection module 1000 of the CPS allows the user to select the type of process 1000A and configure the operating/cutting parameters 1000B (e.g., by prompting the user to select the type of process and configure the operating parameters as discussed, for example, in FIGS. 4-5). In some embodiments, the operating parameter selection module presents the user with options/lists of values for mandatory operating parameters (e.g., a series of pre-identified operating parameters) to choose from.

For example, the operating parameter selection module 1000B can allow a user to choose the type of torch. The operating parameter selection module can provides the user with and prompt the user to choose from a list of torch types (e.g., the T100M, FineCut, Max 200, and HySpeed, all available from Hypertherm, Inc. of Hanover, N.H.). The operating parameter selection module 1000B can provide the user with a default torch type. In some embodiments, the operating parameter selection module 1000B can automatically detect the type of torch mounted in the plasma cutting system. In some embodiments, the operating parameter selection module 1000B automatically selects the same torch type as the one selected from a previous run (e.g., a recent cut).

The operating parameter selection module 1000B can allow the user to choose the material type to be cut (e.g., by prompting the user to select from a list of materials), for example, as discussed above in FIGS. 4-5. The operating parameter selection module 1000B can present the user with a list of material types (e.g., aluminum, steel, various stainless steels, titanium, bronze, or many other types of materials). In some embodiments, the operating parameter selection module 1000B provides the user with a default material type. In some embodiments, the operating parameter selection module 1000B automatically selects the same material as the one selected from a previous run (e.g., a recent cut).

The operating parameter selection module 1000B can allow the user to choose the operating current, for example, as discussed above in FIG. 4. In some embodiments, the operating parameter selection module 1000B presents the user with a range of operating currents (e.g., between about 40-200 A of operating current). In one embodiment, the operating parameter selection module 1000B provides the user with a default operating current. In some embodiments, the operating parameter selection module 1000B automatically selects the same operating current as the one selected from a previous run (e.g., a recent cut).

In some embodiments, the operating parameter selection module 1000B allows the user to choose a gas flow (e.g., plasma and/or shield gases), for example, as discussed above in FIG. 4. In one embodiment, the operating parameter selection module 1000B allows the user to select a separate gas for the plasma and shield gases. The operating parameter selection module 1000B can present the user with a list of operating gases (e.g., air, oxygen, nitrogen, argon, or hydrogen). In some embodiments, the operating parameter selection module 1000B provides the user with a default operating gas. The operating parameter selection module 1000B can automatically select the same operating gas as the one selected from a previous run (e.g., a recent cut).

The operating parameter selection module 1000B can allow the user to choose the material thickness, for example, as discussed above in FIGS. 4-5. In one detailed embodiment, the operating parameter selection module 1000B presents the user with a range of material thicknesses (e.g., between about 14 GA to over 3 inches). In some embodiments, the operating parameter selection module 1000B provides the user with a default material thickness. The operating parameter selection module 1000B can automatically select the same material thickness as the one selected from a previous run (e.g., a recent cut).

The operating parameter selection module 1000A can allow the user to choose the type of process type to run (e.g., a cutting process or a marking process). A marker cutting process type can include a step of applying a low current to the torch such that only an outline or etching of the shape is imprinted on the material. Marker cutting processes can be used, for example, in testing to determine whether the torch has been properly set up. The operating parameter selection module can allow the user to select the type of cutting process. In some embodiments, the operating parameter selection module presents the user with a selection of cutting processes, which can include plasma 1, plasma 2, water jet, laser, and oxy fuel. The operating parameter selection module can provide the user with a default process type (e.g., provide the user with a specific cutting process type, such as a plasma cutting process). The operating parameter selection module can automatically select the same process type as the one selected from a previous run (e.g., a recent cut).

In an embodiment, the operating parameter selection module 1000 presents the user with all of the options listed above (e.g., select the type of torch, material type, operating current, gas flow, material thickness, process type (i.e., cutting or marking)). In some embodiments, the operating parameter selection module presents the user with all of the options listed above on the same screen or menu or presents the user with the options on different screens or menus.

The alignment module 1010 of the CPS can allow the user to align the torch with a corner of the workpiece. Alignment module 1010A allows the user to choose to proceed with alignment or to skip and proceed with choosing a start location, for example, as described in FIG. 6. For example, the alignment module 1010B allows the user, in a graphical user interface to select a corner of the workpiece, to align the workpiece (e.g., as described in FIG. 8). In some embodiments, the alignment module 1010C provides the user with controls to manually align the torch with a corner of the workpiece (e.g., as described in FIG. 8-9). The controls can include directional controls (e.g., X-Y controls), speed controls, and/or torch height controls (e.g., as discussed in FIGS. 8-9). In some embodiments, the alignment module allows the user to align the torch based on more than one point on the workpiece.

In some embodiments, the alignment module 1010A presents the user with the option of skipping alignment and proceeding directly to processing (e.g., cutting or marking) (e.g., as shown in FIG. 6). For example, the alignment module 1010D presents the user with the option of skipping alignment and moving the torch to a desired process location (e.g., to select a starting point). In some embodiments, the alignment module 1010D provides the user with controls to move the torch directly over the location on the workpiece to begin cutting. The alignment module 1010D can provide the user with the option of moving the torch faster or slower than the current speed (e.g., decelerating or accelerating the torch). The alignment module 1010D can provide the user with the option of raising or lowering the torch height.

The skew adjustment module 1020 of the CPS allows a user to adjust for skew of the workpiece. The skew adjustment module 1020A can provide the user with the option of skipping the step of adjusting for skew or proceeding with adjusting for skew (e.g., as described in FIG. 10). For example, in some embodiments, the skew adjustment module 1020B provides the user with the option of selecting a point on the workpiece to align the torch to adjust for skew (e.g., as described in FIG. 11). The skew adjustment module 1020C can provide the user with controls to manually align the torch with a point on the workpiece. The controls can include directional controls (e.g., X-Y controls or features in the CPS or graphical user interface), speed controls, and/or torch height controls. In some embodiments, a user can use the skew adjustment module 1020D to save the skew adjustment for future use (e.g., by prompting the user to save the skew adjustment in a graphical user interface).

The part clearance module 1030 of the CPS can present a user with the option to input the part clearance for the shape to be cut (e.g., as described in FIG. 12). For example, the part clearance module 1030 can present the user with a range of part clearance (e.g., between 0-1 inch) to choose from. In some embodiments, the part clearance module 1030 provides the user with a default part clearance. In some embodiments, the part clearance module 1030 automatically selects the same part clearance as the one selected from a previous run (e.g., a recent cut). The part clearance module 1030 can present/choose an optimal part clearance based on the selected shape to be cut, so that the greatest number of shapes can be cut on a workpiece.

The review settings module 1040 of the CPS can allow the user to review the settings for the cutting/marking process (e.g., by showing the settings in a graphical user interface for settings in a laser cutting process or plasma cutting process) (e.g., as described above in FIGS. 14-15). In some embodiments, the review settings module 1040 can include a summary of the shape to be cut, the operating parameters (e.g., torch type, material type, operating current, plasma/shield gases, and/or material thickness), the process type selections (e.g., plasma 1, plasma 2, water jet, laser, oxy fuel, and/or marking), and/or the alignment and skew settings. In some embodiments, the review settings module 1040 allows the user to edit/change the overall settings. The user can edit the settings on the same screen or on a different screen.

The final alignment module 1050 of the CPS allows a user to align the torch with another point on the workpiece (e.g., as shown in FIG. 14).

The select cut module 1060 of the CPS can allow a user to select the cut mode for processing (e.g., plasma 1, plasma 2, water jet, laser, oxy fuel, and/or marking). The select cut module 1060 can include an electronic library of part programs (e.g., cut modes) having pre-configured operating parameters. The library of cut modes can specify a torch type, a material type, an operating current, a gas flow/composition, and/or a material thickness. For example, a part program entitled "plasma 1" can be pre-configured as torch type T100M (manufactured by Hypertherm, Inc. of Hanover, N.H.), with a specified material type of steel, a specified operating current of 100 A, a specified plasma gas of nitrogen, and a specified material thickness of 28 GA. The CPS can allow the user to pre-configure the torch type at the process selection module 115. In some embodiments, the select cut module 1060 presents the user with a default cut mode. The select cut module 1060 can automatically select the same cut mode as the one selected from a previous run (e.g., from a previous cut).

The confirmation module 1070 of the CPS allows a user to begin processing (e.g., cutting or marking of a workpiece) using the selected operating parameters (e.g., parameters predefined in a part program or parameters specified/identified by the user) for example, as shown in FIG. 15. The confirmation module 1070 can permit the user to return to prior modules (e.g., the introduction module 980, the part selection module 990, the operating parameter selection module 1000, the alignment module 1010, the skew adjustment module 1020, the part clearance module 1030, the review settings module 1040, the final alignment module 1050, or the select cut module 1060) to edit process parameters. In some embodiments, the confirmation module 1070 provides the user with the opportunity to cancel further processing. In some embodiments, the confirmation module 1070 permits the user to save the process parameters for future use (e.g., by prompting the user determine whether they wish to save the process parameters for future use).

The help module (not shown) of the CPS can present the user with information related to the process for configuring the digital signal processor (e.g., a CNC). In some embodiments, the help module provides contextual help related to a particular process screen or selection. The help module can provide global help related to the CNC configuration process. In some embodiments, the CPS presents the option of accessing the help module at any of the other modules.

An automated high temperature thermal cutting system can include a digital signal processor, a torch tip that produces a cutting arc, a lead that provides a cutting current to the plasma arc torch, and an automated gantry that moves the plasma torch tip. In some embodiments, the automated high temperature thermal cutting system is a plasma arc torch system (e.g., as shown in FIG. 1) and the torch tip is a plasma torch tip including a nozzle and an electrode. The nozzle and electrode can define a plasma chamber, a plasma arc generated in the plasma chamber. The digital signal processor (e.g., such as the digital processor 160 of FIG. 1, such as a computer numerical controller) can include a first module (e.g., part selection module 99) that processes data for at least one part to be cut from a workpiece (e.g., receives or processes a part program) and a second module (e.g., an operating parameter selection module 1000) that prompts a user to select values from a menu of mandatory operating parameters for a shape of the at least one part. Mandatory operating parameters can include at least one of an operating current, a gas flow, a thickness of the workpiece or a material of the workpiece. The computer numerical controller can include a third module that selects a starting point to cut the at least one part from the workpiece based on an alignment of the workpiece (e.g., as shown in FIG. 13). As described above, when plate alignment is selected the user is prompted to select a corner of the plate. This is preferably used as the starting point. If plate alignment is not selected, then the first point selected becomes the starting point, which need not be a corner of the plate (workpiece).

The digital signal processor can also include an alignment module (e.g., alignment module 1010) that aligns the workpiece. The alignment module can process data from at least one auto align sensor that scans the workpiece to determine the alignment of the workpiece. The alignment module can process inputs from a user who manually aligns the workpiece or a sensor for automatic alignment. In some embodiments, the second module prompts the user to identify the shape of the at least one part to be cut from the workpiece.

Testing was performed with novice users for a plasma arc cutting system that used a CPS and user interface in a CNC of a plasma cutting system substantially similar to that described above in FIGS. 1-16. In the tests, a workpiece was loaded with a skew. The testing users were briefed on purpose of the user test (e.g., to determine if using the CPS and user interface would aid in operating the plasma arc cutting system). The test users were given a part program on a USB stick to load. The test users had to select the correct part program, from several part programs, for the shape of the part to be cut from the workpiece. The test users also had to select the correct process (e.g., operating parameters such as the gas flow, current level, thickness of the workpiece, etc) and a required part clearance. The default table conditions were set to force the test users to utilize all functions of the CPS (e.g., the "Cutting Wizard") to correctly operate the cutting system. For example, the table speed was set at 5 ipm, the torch location was way off the plate, the wrong processes were originally selected, etc. The user therefore, had to use the CPS to correctly program the operation of the cutting system. During the tests, the test users were not given any further information as to how to use the CNC. The user interface for the CPS was already on the screen when they approached the CNC. As shown in Table 1, 95.5% of test users were able to operate the cutting system using the CPS, whereas none of the test users using the prior art system were successful.

TABLE 1

|  | CPS System | Prior Art System (Without CPS System) |
| --- | --- | --- |
| Number of Tests | 22 | 9 |
| Number Successful | 21 | 0 |
| Percentage Successful | 95.5% | 0% |

The above-described techniques can be implemented in digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers)).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific illustrative embodiments, such as plasma arc cutting systems or laser cutting systems, it should be understood that various changes in form and detail may be made without departing from the spirit and scope of the invention. For example, features and techniques for the invention can be used with other high temperature thermal cutting systems, for example, laser cutting systems. The alternatives described herein are examples for illustration only and not to limit the alternatives or invention in any way. The steps of the invention can be performed in a different order and still achieve desirable results.

What is claimed is:

1. A computer-implemented method for setting up a cutting table for an automated high temperature thermal cutting system to cut a shape selected by a user, the method comprising:
    loading into a computer a computer-readable product including data for the shape of at least one part to be cut from a workpiece;
    selecting, by the computer, mandatory operating parameters that correspond to a process and workpiece for the shape of the at least one part to be cut from the workpiece;
    requiring, by the computer, the user to select values for at least one parameter selected by the computer, the at least one parameter from a predetermined menu of the mandatory operating parameters for the shape of the at least one part to be cut from the workpiece, wherein the predetermined menu of mandatory operating parameters comprise at least two of an operating current, a gas flow, a thickness of the workpiece or a material of the workpiece; and
    controlling the high temperature thermal cutting system in accordance with the selected values.

2. The method of claim 1 further comprising providing a computer-readable product including a library of part programs for a plurality of shapes.

3. The method of claim 1 further comprising prompting the user to select values from the menu of mandatory operating parameters using a graphical user interface.

4. The method of claim 1 wherein the automated high temperature thermal cutting system is a plasma cutting system or a laser cutting system.

5. The method of claim 1, further comprising prompting a user to select values from a menu of operating parameters comprising at least one of a type of high temperature thermal cutting system, a torch type or a consumable set.

6. The method of claim 1, further comprising prompting a user to align the workpiece.

7. A computer readable product, tangibly embodied on a non-transitory computer readable medium or a machine-readable storage device and operable on a digital signal processor for a high temperature thermal cutting system to cut a shape selected by a user, the computer readable product including instructions operable to cause the digital signal processor to:
    receive, by the non-transitory computer readable medium or the machine-readable storage device, at least one part program including data for the shape of at least one part to be cut from a workpiece;
    select, by the non-transitory computer readable medium or the machine-readable storage device, mandatory operating parameters that correspond to a process and workpiece for the shape of the at least one part to be cut from the workpiece;
    present, by the non-transitory computer readable medium or the machine-readable storage device, at least one predetermined step to require a user to select values for at least one parameter selected by the non-transitory computer readable medium from a predetermined menu of mandatory operating parameters for the shape of the at least one part to be cut, wherein the at least one predetermined step requires the user to identify a first set of entries comprising at least two of an operating current, a gas flow, a thickness of the workpiece or a material of the workpiece;
    select, by the non-transitory computer readable medium, a starting point to cut the at least one part from the workpiece based on an alignment of the workpiece; and
    control the high temperature thermal cutting system in accordance with the selected values.

8. The computer readable product of claim 7, wherein the at least one predetermined step is presented to the user using a graphical user interface.

9. The computer readable product of claim 7, further comprising a second predetermined step presented to a user to select values from a menu of operating parameters wherein the second predetermined step prompts the user to identify a second set of entries comprising at least one of a type of high temperature thermal cutting system, a torch type or a consumable set.

10. The computer readable product of claim 9, wherein the second predetermined step is presented to the user after the user has identified the first set of entries.

11. The computer readable product of claim 7, wherein the high temperature thermal cutting system is a plasma arc cutting system or a laser cutting system.

12. The computer readable product of claim 11, wherein the high temperature thermal cutting system is a laser cutting system and the first set of entries further comprises an assist gas composition, a focal length of a laser and a nozzle type.

13. The computer readable product of claim 7, wherein at least one auto align sensor scans the workpiece to determine the alignment of the workpiece.

14. The computer readable product of claim 7, wherein a user manually aligns the workpiece and the computer readable product includes instructions being operable to cause the digital signal processor to prompt a user to align the workpiece used to select the starting point to cut the at least one part from the workpiece.

15. The computer readable product of claim 14, wherein the alignment of the workpiece is based on a corner of a cutting table for the high temperature thermal cutting system and at least one edge of the workpiece.

16. The computer readable product of claim 14, wherein the high temperature thermal cutting system is a laser cutting system and a laser pointer is used as a reference to align a torch head.

17. The computer readable product of claim 7, further comprising instructions being operable to cause the digital signal processor to:
prompt the user to select a part clearance around edges of the work piece; and
present a setting review to the user comprising at least the mandatory operating parameters identified from the first set of entries.

18. A computer readable product, tangibly embodied on a non-transitory computer readable medium or a machine-readable storage device and operable on a digital signal processor for a high temperature thermal cutting system to cut a shape selected by a user, the computer readable product including instructions operable to cause the digital signal processor to:
receive, by the non-transitory computer readable medium or the machine-readable storage device, a part program including data for the shape of at least one part to be cut from a workpiece, wherein the part program specifies a material type of the workpiece and a thickness of the workpiece;
select, by the non-transitory computer readable medium or the machine-readable storage device, mandatory operating parameters that correspond to a process and workpiece for the shape of the at least one part to be cut from the workpiece; and
present, by the non-transitory computer readable medium or the machine-readable storage device, a plurality of predetermined steps comprising:
a first step that requires the user to load and align a workpiece having the material type and the thickness as specified by the part program; and
a second step that requires the user to select values from a predetermined menu of mandatory operating parameters for the shape of the at least one part to be cut, wherein the second step requires the user to identify a first set of entries comprising at least an operating current or a gas flow.

19. The computer readable product of claim 18 wherein the plurality of predetermined steps further comprises a third step that prompts the user to identify the shape of the at least one part to be cut from the workpiece before prompting the user to identify the first set of entries.

20. The computer readable product of claim 18 wherein the first set of entries further comprises at least torch type and a consumable set.

21. The computer readable product of claim 20 wherein the plurality of predetermined steps further comprises a third step that prompts the user to load a consumable type for the torch type identified by the user in the second step.

22. The computer readable product of claim 20 wherein the consumable set corresponds to the identified operating current.

23. The computer readable product of claim 18 wherein the first step provides a bar code or identification number to the user identifying a corresponding workpiece having the material type and the thickness as specified by the part program.

24. The computer readable product of claim 18 wherein the part program specifies a consumable type to be loaded in the high temperature thermal cutting system.

25. The computer readable product of claim 24 wherein the plurality of predetermined steps further comprises a third step that prompts the user to load the consumable type specified by the part program.

26. The computer readable product of claim 18 wherein the plurality of predetermined steps further comprises a third step to a user to select values from a menu of operating parameters, wherein the third step prompts the user to identify a second set of entries comprising at least a consumable type to load into a torch of the high temperature thermal cutting system.

27. The computer readable product of claim 18 further including instructions being operable to cause the digital signal processor to select a starting point to cut the at least one part from the workpiece based on an alignment of the workpiece.

28. The computer readable product of claim 18 wherein the material type of the workpiece is mild steel, the thickness of the workpiece is ½ inch and the first step prompts the user to load and align a ½ inch thick steel workpiece in the high temperature thermal cutting system.

29. A computer readable product, tangibly embodied on an a non-transitory computer readable medium, and operable on a computer numerical controller for an automated high temperature thermal cutting system to cut a shape selected by a user, the computer readable product including instructions operable to cause the computer numerical controller to:
process, by the non-transitory computer readable medium, data for the shape of at least one part to be cut from a workpiece;
select, by the non-transitory computer readable medium, mandatory operating parameters that correspond to a process and workpiece for the shape of the at least one part to be cut from the workpiece;
require, by the non-transitory computer readable medium, a user to select values for at least one parameter selected by the computer readable product, the at least one parameter from a predetermined menu of the mandatory operating parameters for the shape of the at least one part, wherein the predetermined menu of mandatory operating parameters comprise at least two of an operating current, a gas flow, a thickness of the workpiece or a material of the workpiece;

select, by the non-transitory computer readable medium, a starting point to cut the at least one part from the workpiece based on an alignment of the workpiece; and control the high temperature thermal cutting system in accordance with the selected values.

30. The computer readable product of claim 29 further including instructions being operable to cause the computer numerical controller to align the workpiece.

31. The computer readable product of claim 30 wherein the computer numerical controller further processes data from at least one auto align sensor that scans the workpiece to determine the alignment of the workpiece.

32. The computer readable product of claim 30 wherein the computer numerical controller further processes inputs from a user that manually aligns the workpiece.

33. The computer readable product of claim 29 wherein the computer numerical controller further requires the user to identify the shape of the at least one part to be cut from the workpiece.

34. An automated high temperature thermal cutting system comprising:
- a torch tip that produces a cutting arc;
- a lead that provides a cutting current to the plasma arc torch;
- an automated gantry that moves a plasma torch tip; and
- the computer numerical controller of claim 29.

35. The system of claim 34 wherein the automated high temperature thermal cutting system is a plasma arc torch system and the torch tip is a plasma torch tip including a nozzle and an electrode, the nozzle and electrode defining a plasma chamber, a plasma arc generated in the plasma chamber.

36. A computer readable product, tangibly embodied on an a non-transitory computer readable medium for setting up a cutting table for an automated high temperature thermal cutting system to cut a shape selected by a user, the computer readable product comprising:

means for processing, by the non-transitory computer readable medium, at least one part program that includes data for the shape of at least one part to be cut from a workpiece;

means for selecting, by the non-transitory computer readable medium, mandatory operating parameters that correspond to a process and workpiece for the shape of the at least one part to be cut from the workpiece;

means for requiring, by the non-transitory computer readable medium, at least one predetermined step to the user to select values for at least one parameter selected by the computer readable product, the at least one parameter from a predetermined menu of the mandatory operating parameters for the shape of the at least one part, wherein the predetermined menu of mandatory operating parameters include at least two of an operating current, a gas flow, a thickness of the workpiece or a material of the workpiece;

means for aligning the workpiece;

means for selecting a starting point to cut the at least one part from the workpiece based on an alignment of the workpiece; and means for controlling the high temperature thermal cutting system in accordance with the selected values.

* * * * *